(12) United States Patent
Larson

(10) Patent No.: US 10,377,505 B2
(45) Date of Patent: *Aug. 13, 2019

(54) PASSAGEWAY TO BOARD AND DEPLANE AN AIRPLANE

(71) Applicant: East Island Aviation Services, Inc., Huntington, NY (US)

(72) Inventor: James Larson, Lloyd Harbor, NY (US)

(73) Assignee: East Island Aviation Services, Inc., Huntington, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/923,597

(22) Filed: Mar. 16, 2018

(65) Prior Publication Data

US 2018/0201392 A1 Jul. 19, 2018

Related U.S. Application Data

(63) Continuation of application No. 15/200,466, filed on Jul. 1, 2016, now Pat. No. 9,932,130.

(Continued)

(51) Int. Cl.
*B64F 1/30* (2006.01)
*E04H 15/18* (2006.01)
(Continued)

(52) U.S. Cl.
CPC ............ *B64F 1/30* (2013.01); *E04H 15/18* (2013.01); *E04H 15/405* (2013.01); *E04H 15/505* (2013.01); *E04H 15/52* (2013.01)

(58) Field of Classification Search
CPC ..... E04H 15/18; E04H 15/405; E04H 15/505; B64F 1/30; B64F 1/305
See application file for complete search history.

(56) References Cited

U.S. PATENT DOCUMENTS 3,131,705 A 5/1964 Marino
3,256,896 A 6/1966 Cummins
(Continued)

FOREIGN PATENT DOCUMENTS

FR 2886624 A1 12/2006
WO WO 96/23715 8/1996
(Continued)

OTHER PUBLICATIONS

International Search Report and Written Opinion issued in International Application No. PCT/US2016/040735 dated Oct. 21, 2016.

*Primary Examiner* — Noah Chandler Hawk
(74) *Attorney, Agent, or Firm* — Hoffmann & Baron, LLP

(57) ABSTRACT

Passageway including a section that is extendable and retractable, the section including frame, slide track assemblies, and scissor bar assembly. The frame includes upright members on a first side of the frame. The slide track assemblies are disposed proximately to the upright members. Each of the slide track assemblies includes a slide track and a slide block. The slide track has a cavity and a channel. The slide block can ascend, descend, and rotate within the cavity. The slide block includes a guide block that extends from the slide block through the channel. The scissor bar assembly is secured to the upright members and slide blocks of the slide track assemblies such that the upright members are enabled to extend and retract with respect to each other along an arcuate path, wherein the guide block limits rotation of the slide block to rotation of the guide block within the channel.

20 Claims, 17 Drawing Sheets

Related U.S. Application Data

(60) Provisional application No. 62/188,032, filed on Jul. 2, 2015.

(51) Int. Cl.
*E04H 15/40* (2006.01)
*E04H 15/50* (2006.01)
*E04H 15/52* (2006.01)

(56) References Cited

U.S. PATENT DOCUMENTS

| | | |
|---|---|---|
| 5,331,777 A | 7/1994 | Chi-Yuan |
| 5,603,343 A | 2/1997 | Larson |
| 9,745,080 B2 | 8/2017 | Gutkuhn et al. |
| 2004/0144412 A1 | 7/2004 | Tsai |

FOREIGN PATENT DOCUMENTS

| | | |
|---|---|---|
| WO | WO 01/24601 A2 | 4/2001 |
| WO | WO 01/25557 A1 | 4/2001 |

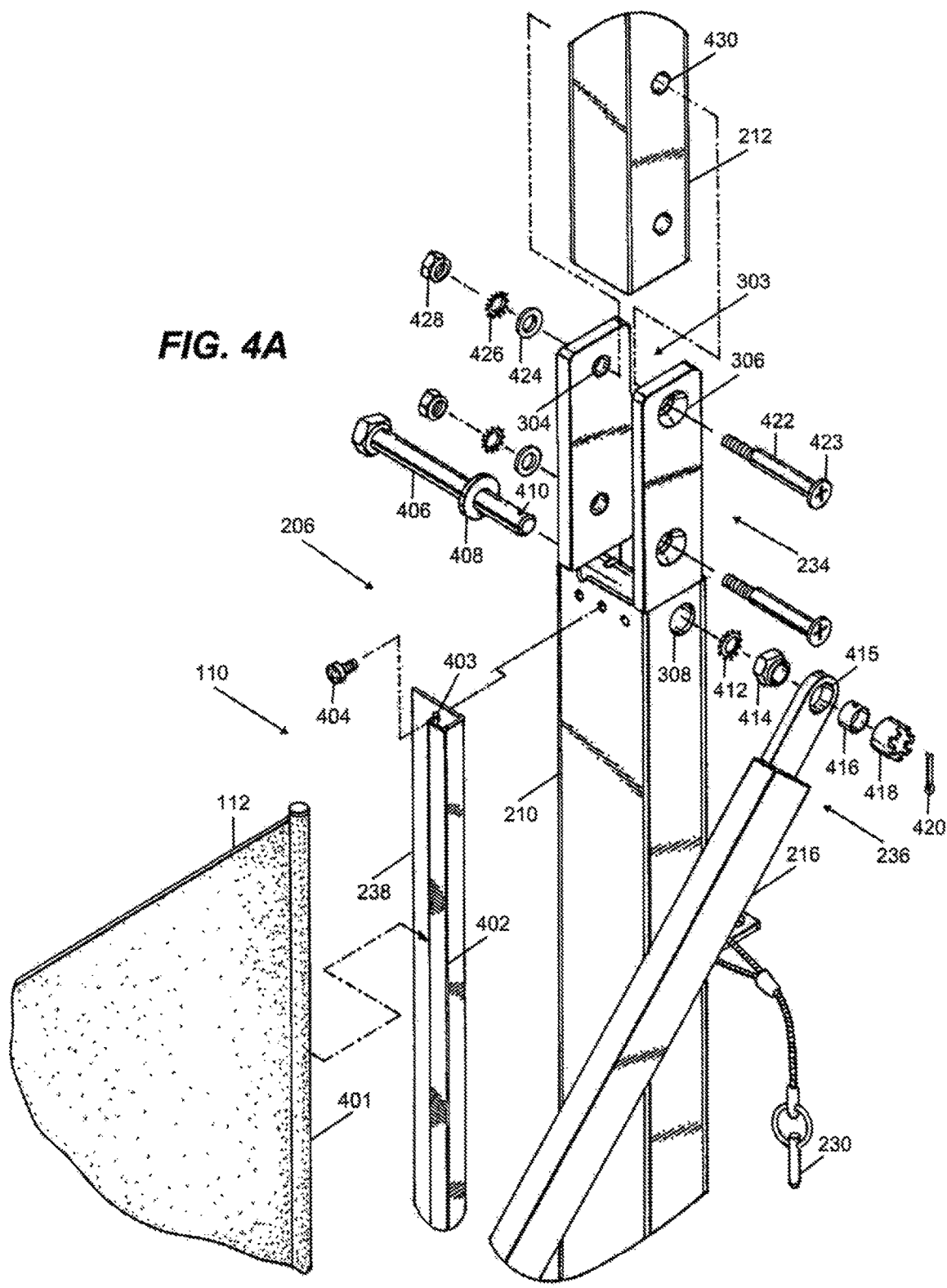

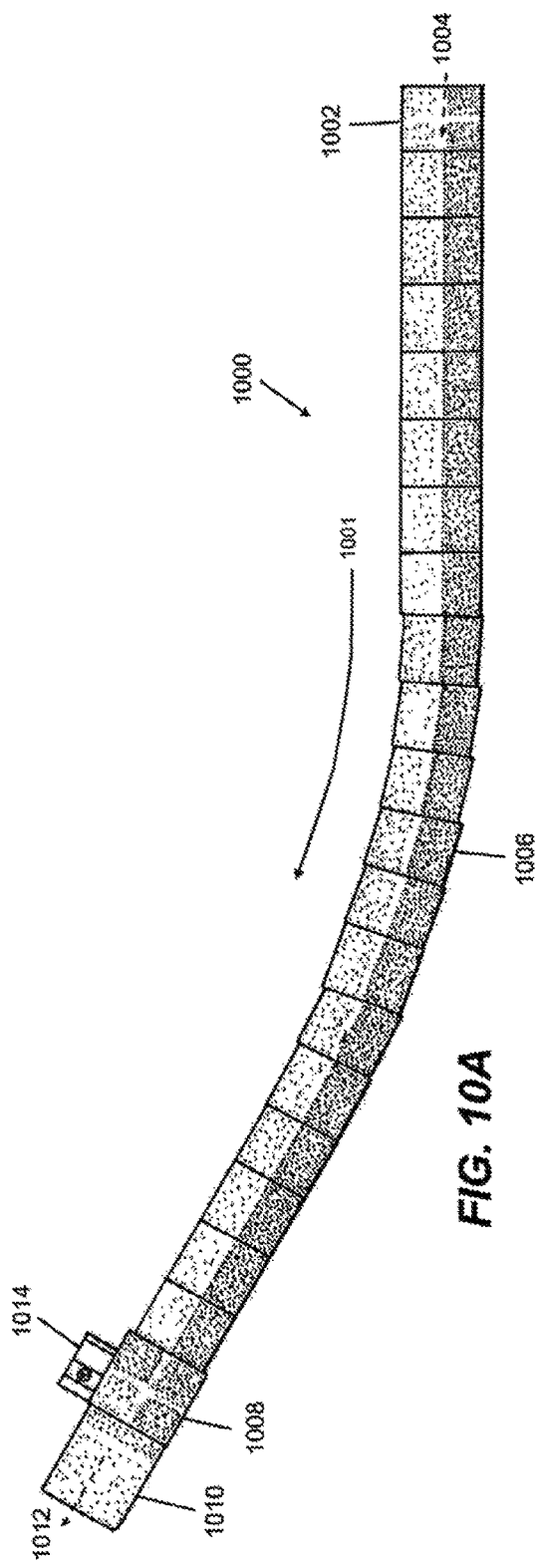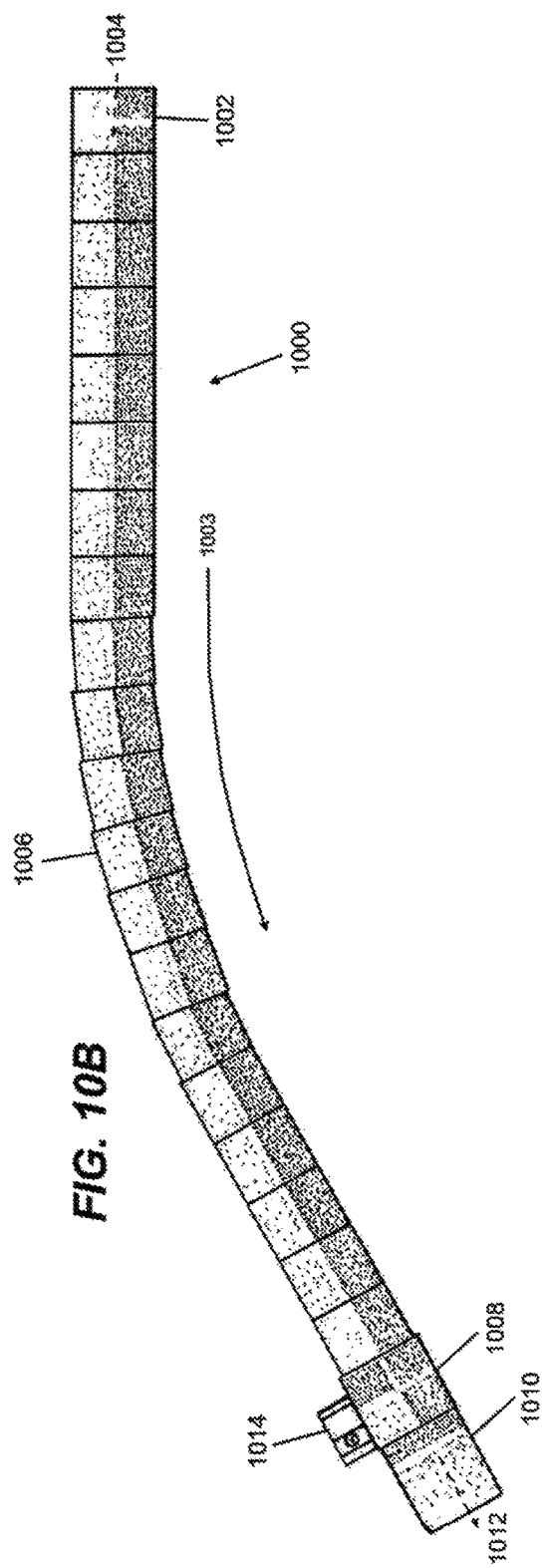

PASSAGEWAY TO BOARD AND DEPLANE AN AIRPLANE

CROSS-REFERENCE TO RELATED APPLICATIONS

This application is a continuation of U.S. application Ser. No. 15/200,466, filed on Jul. 1, 2016, which claims the benefit of U.S. Provisional Patent Application No. 62/188,032, filed on Jul. 2, 2015, both of which are incorporated herein by reference in their entirety.

BACKGROUND

Field

The present application relates to airplane boarding and deplaning systems. More specifically, the present application is directed to a passageway to board and deplane an airplane.

Brief Discussion of Related Art

Boarding bridges, also known as loading bridges or jet bridges, are second-level bridges that enable passengers to board an airplane from a gate of an airport terminal and disembark (or deplane) the airplane to the gate. These boarding bridges generally have retractable telescoping designs, which allow the boarding bridges to retract and extend (or telescope) to desired lengths in order to couple or interface with arriving and/or departing airplanes. These tend to be larger airplanes—generally having doorsill heights between about six feet and about sixteen feet—which can be boarded and deplaned at the second-level using the boarding bridges.

While such boarding bridges allow for safe and efficient boarding and deplaning at the second-level height, these boarding bridges are not used for smaller airplanes (e.g., regional airplanes), as such airplanes generally have doorsill heights that are below six feet. Accordingly, the boarding bridges cannot interface with such low doorsill airplanes. Such airplanes generally have retractable stairways, which allow boarding and deplaning to the airport apron or tarmac.

In the case of smaller airplanes, airports generally employ ground-level passageways, which permit safe and efficient boarding and deplaning at the ground-level (e.g., airport apron or tarmac) to a ground-level entrance to the gate of the airport terminal. The airplane generally parks a certain distance from the airport terminal, the passageway is extended from the ground-level entrance of the second-level gate to the stairway of the airplane, allowing passengers to board and deplane the airplane using the passageway and the stairway. At the entrance to the gate, passengers similarly climb a staircase in order to enter the second-level airport terminal. Accordingly, the passageway provides safety and security to passengers between the airplane and the gate, without exposure to outside weather.

In general, a ground-level passageway has multiple sections that extend to provide a covered walkway between the gate and the airplane. Because airplanes can be positioned on the apron or tarmac at different distances and orientations with respect to the gate, the sections of passageway must be able to extend and retract to various distances and along various arcs or paths in order to couple or interface with arriving and/or departing airplanes. After conclusion of boarding or deplaning, the multiple sections of the extended passageway should be able to be retracted for stowing.

Over time with multiplicity of extensions-retraction cycles, the passageway can be subject to malfunction. One problem is the alignment of the multiple sections when the passageway is retracted. If the sections are misaligned during retraction, the extension mechanisms of the sections (e.g., scissor-bars) can be damaged (e.g., bent). When such damage occurs, it may not be possible to extend the passageway in a desired arc or path to couple or interface with arriving and/or departing airplanes. Another problem is that the misalignment can cause the extension mechanisms of the sections to jam or bind (e.g., scissor-bars jammed in a slide track), and contributes to the inability to retract the passageway to desired shape and/or position, which over time can become progressively worse. Yet another problem is the construction of the canopy section that can allow the multiple sections to flex, which can exacerbate the foregoing alignment problems.

It is therefore desirable to provide a passageway that can mitigate the foregoing alignment problems over multiplicity of extensions-retraction cycles, permitting extension along various paths to interface with arriving/departing airplanes, and permitting retraction for stowing.

SUMMARY

There is provided a passageway that includes a plurality of sections, the sections including at least one section that is extendable and retractable. The at least one section includes a frame structure, a pair of slide track assemblies, and a scissor bar assembly.

The frame structure includes a pair of upright members on a first side of the frame structure.

The pair of slide track assemblies are disposed proximately to the respective pair of the upright members on the first side of the frame structure. Each of the slide track assemblies includes a slide track and a slide block. The slide track has a cavity and a channel. The slide block is configured to ascend, descend, and rotate within the cavity. The slide block includes a guide block that extends from the slide block at least partially through the channel.

The scissor bar assembly is rotatably and pivotably secured to the pair of upright members and secured pivotably to slide blocks of the pair of slide track assemblies such that the pair of upright members is enabled to extend and retract with respect to each other along at least one arcuate path of the passageway, wherein the guide block limits rotation of the slide block within the slide track to rotation of the guide block within the channel.

In some embodiments or aspects, the slide track can be defined by a back wall, perpendicular sidewalls, and angled sidewalls. The angled sidewalls can extend toward each other from the perpendicular sidewalls to define the channel. Moreover, the slide block can have a generally round cross-section.

In some embodiments or aspects, the slide block can include an alignment guide block. The alignment guide block includes an arm and the guide block. The arm can be secured within the channel of the slide block, and the guide block can be secured to the aim.

In some embodiment or aspects, the scissor bar assembly can include at least one scissor bar, which includes a first connector and a second connector. The first connector can be secured pivotably within the channel of the slide block, while the second connector can be secured rotatably and pivotably to an upright member.

In some embodiments or aspects, a connection device can be provided to secure the second connector rotatably and pivotably to the upright member. The connection device can include a lock nut having a domed end about which the second connector rotates and pivots in relation to the upright member.

In some embodiment or aspects, the pair of upright members can include a pair of reciprocally mating members. The reciprocal mating members can include a first mating member and a second mating member. The first mating member can include a back, flared sides, and an arcuate receiving recess, while the second mating member can include a back, flared sides, and an arcuate protrusion, wherein the arcuate protrusion is enabled to align with the arcuate receiving recess. Moreover, the second mating member can include a band that extends at least partially along the arcuate protrusion, wherein the band is enabled to interface with the arcuate receiving recess. A pair of wheel assemblies can be secured to the reciprocal mating members.

In some embodiment or aspects, the frame structure can include a second pair of upright members on a second side of the frame structure, and an arch member secured to an upright member of the pair and an upright member of the second pair. The arch member can include a plurality of curved sections and a plurality of corresponding notched sections. The curved sections can extend along a top portion of the arch member and the notched sections can extend along a bottom portion of the arch member, wherein the notched sections are welded to provide stiffness to the arch member and mitigate splay of the upright member of the pair with respect to the upright member of the second pair.

In some embodiment or aspects, the at least one section can include a canopy, wherein the material of the canopy can be translucent or opaque. The canopy can also include one or more sections, wherein the material of at least one of the sections is translucent or opaque.

In some embodiment or aspects, the at least one section of the passageway can include a curtain assembly secured to the pair of upright members, wherein the curtain assembly is extendable and retractable with extension and retraction of the pair of upright members.

BRIEF DESCRIPTION OF DRAWINGS

Some embodiments are illustrated by way of example and not limitation in the figures of the accompanying drawings in which:

FIGS. 4A and 4B illustrate example construction of a top portion of an upright member as illustrated in FIG. 3 of the frame structure 206 as illustrated in FIGS. 2A, 2B, and 2G;

FIGS. 10A and 10B illustrate an example passageway that is extended along several example paths in accordance with FIGS. 1-9;

DETAILED DESCRIPTION

Disclosed hereinafter is a passageway to board and deplane an airplane, as well as to embark and disembark a vessel (e.g., cruise ship), which mitigates alignment problems over multiplicity of extensions-retraction cycles, permitting extension along various paths to interface with arriving/departing airplanes and vessels, as well as permitting retraction for stowing. In the following description, for the purposes of explanation, numerous specific details are set forth in order to provide a thorough understanding of particular embodiments. It will be evident to one skilled in the art, however, that certain embodiments may be practiced without these specific details.

Figure 1:
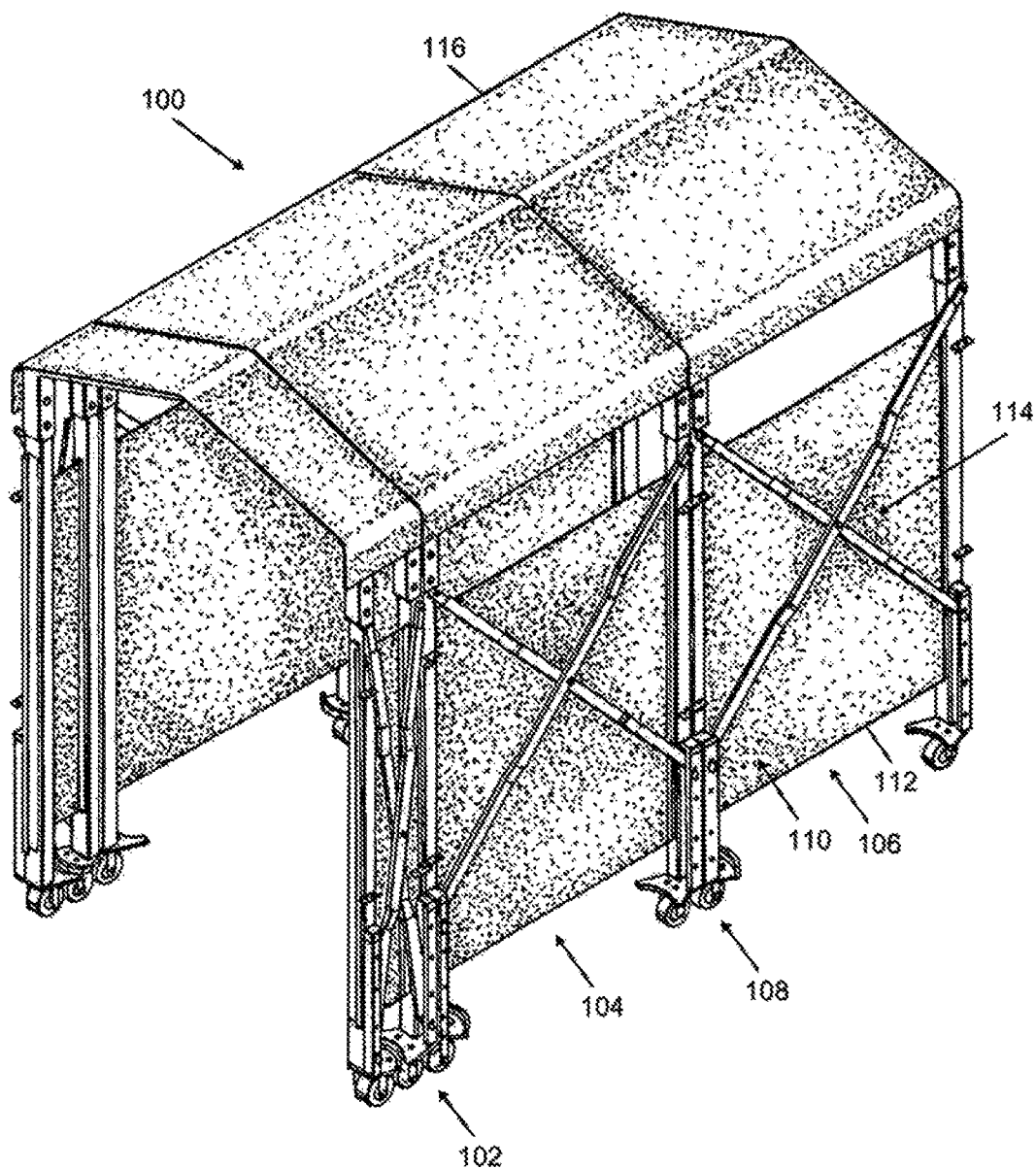
FIG. 1 illustrates example sections of a passageway for boarding and deplaning an airplane.

FIG. 1 illustrates an example portion 100 of a passageway for boarding and deplaning an airplane. The passageway and its operation will be described in greater detail with reference to FIGS. 10A-12D.

The portion 100 of the passageway as illustrated in FIG. 1 includes three example sections 102-106. However, it should be noted that the passageway can include a plurality of sections based on the distance to be spanned between the gate of the terminal and the arriving/departing airplane, as well as based on the arcuate path to be achieved in interfacing with the airplane. A passageway will typically include a dozen or more connectable sections, such as sections 102-106.

The sections 102-106 are extendable and retractable. As illustrated in FIG. 1, section 102 is retracted and sections 104, 106 are extended. While an example construction of a section will be described in greater detail with reference to FIGS. 2A-9, it is worth noting here that the sections 102-106 include elements that enable them to extend along straight and arcuate (curved) paths into various extended configurations, as well as to retract therefrom for stowing into a retracted configuration that is aligned.

Each of the sections 102-106 includes caster wheel assemblies 108, curtain assemblies 110, scissor bar assemblies 114, and canopy 116.

The caster wheel assemblies 108 enable the sections 102-106 to extend in straight and arcuate path configurations, as well as to retract into an aligned configuration for stowing. As will be described in greater detail with reference to FIGS. 2A and 2C, the caster wheel assemblies 108 are disposed at the bottom corners of each section and facilitate movement of the sections 102-106 between the gate of the terminal and the airplane. Moreover, opposing caster wheel assemblies 108 of a section have reciprocal mating plates that enable alignment of the sections 102-106 during retraction of the passageway, as illustrated in FIGS. 2A-2D and 11C.

The curtain assemblies 110 are extendable and retractable with the sections 102-106. The curtain assemblies 110 include material 112 (e.g., vinyl, nylon, another durable/weather-impermeable material, or a combination of durable/weather-impermeable materials) that prevents weather (e.g., rain, snow, sun) from entering the passageway, while open sections (above and below the curtain assemblies) allow light to penetrate into the passageway. It should be noted that the material can be translucent, also allowing light to penetrate while preventing weather from entering the passageway. Moreover, various sections of the curtain assemblies 110 can be opaque or translucent, as may be desired for certain locations or implementations.

The scissor bar assemblies 114 enable the sections 102-106 to extend and retract. As will be described in greater detail with reference to FIGS. 2A, 2B, 2F, and 6, the scissor bar assemblies 114 are disposed at the sides of each section and facilitate extension and retraction of the sections 102-106 between the gate of the terminal and the airplane.

The canopy 116 of each of the sections 102-106 includes a material (e.g., vinyl, nylon, another durable/weather-impermeable material, or a combination of durable/weather-impermeable materials) to mitigate the effects of weather (e.g., sun, rain, snow). The material of the canopy 116 is secured to the sections 102-106, such as using hook-and-loop (e.g., Velcro) strips, other securing mechanisms (e.g., snap fasteners), or a combination of securing mechanisms. It should be noted that the material of the canopy 116 can be translucent, allowing light to penetrate while preventing weather from entering the passageway. Moreover, various sections of canopy 116 can be opaque or translucent, as may be desired for certain locations or implementations.

Figure 2A:
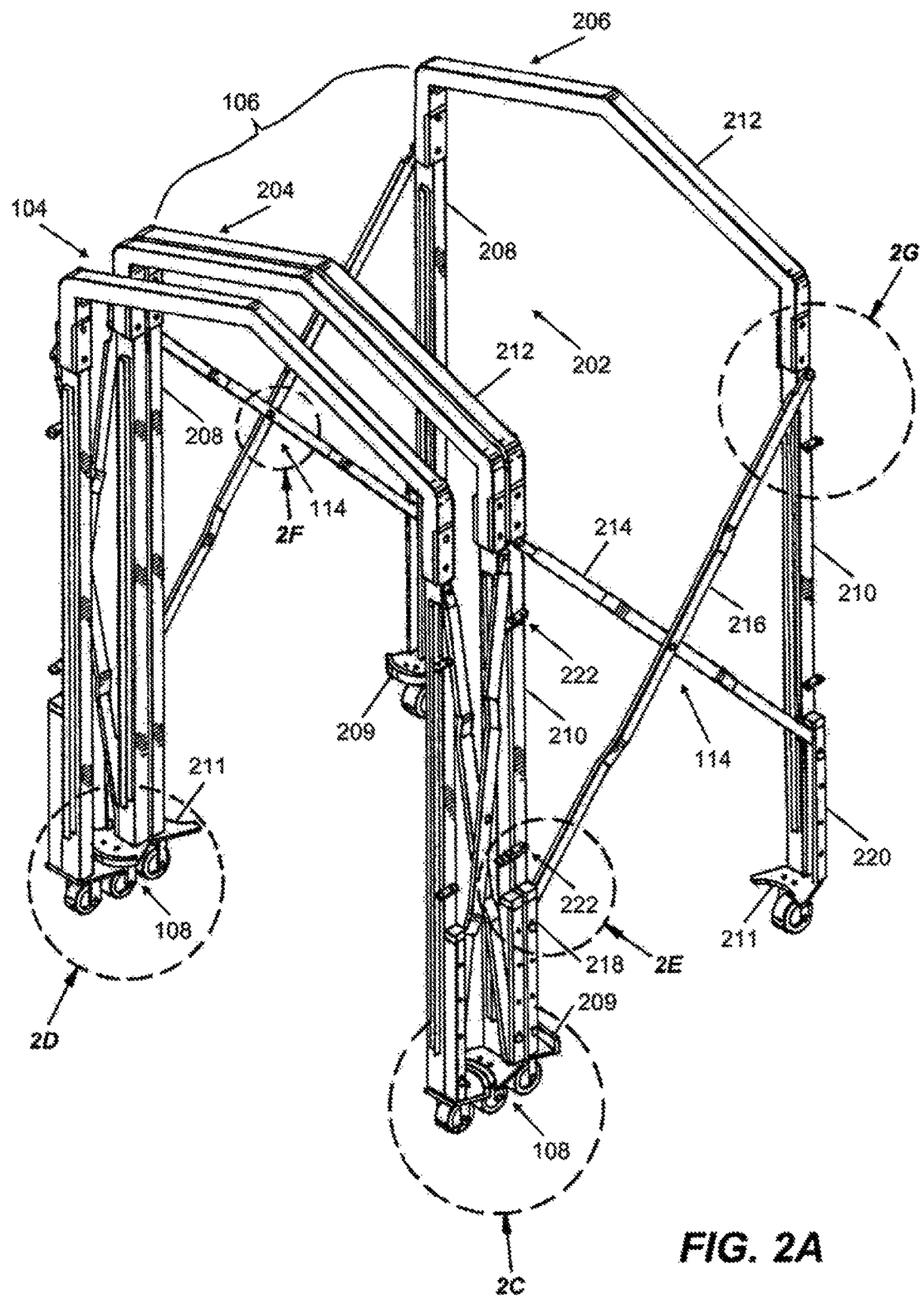
FIGS. 2A-2G illustrate an example frame structure of a section of the passageway illustrated in FIG. 1, without the curtain assembly and canopy as illustrated in FIG. 1.
Figure 2B:
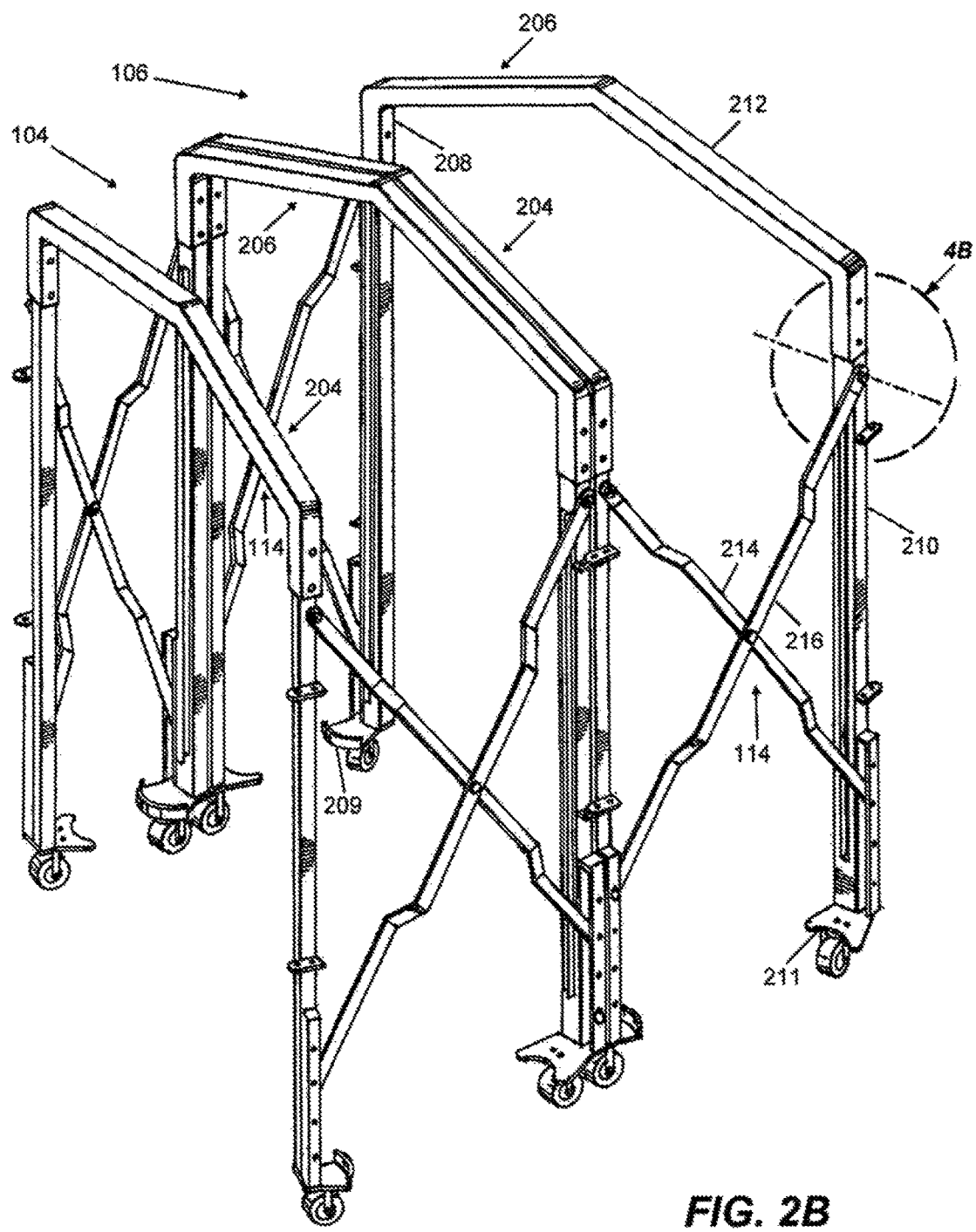

FIGS. 2A-2G illustrate an example frame structure 202 of section 106 of the passageway illustrated in FIG. 1, without the curtain assembly 110 and canopy 116 as illustrated in FIG. 1. The same or similar construction is applicable to others sections of the passageway, such as sections 102, 104 as illustrated in FIG. 1. Moreover, FIGS. 2A and 2B illustrate extension of the passageway along several example paths.

The frame structure 202 includes two opposing frame members 204, 206. The frame members 204, 206 generally have a tubular structure (e.g., square cross-section). It should be noted that the cross-section of the frame members can vary. Each of the frame members 204, 206 includes opposing upright members 208, 210, and an arch frame member 212 that connects the upright members 208, 210 at their top via connection devices 234 (e.g., brackets and nuts/bolts) as illustrated in FIGS. 2G and 4A, forming upside-down u-shaped frame members 204, 206. The construction of the upright members 208, 210 will be described in greater detail with reference to FIG. 3, while the construction of the arch frame members 212 will be described with reference to FIGS. 5A-5C. The connection device 234 will be described in greater detail with reference to FIG. 4.

Moreover, the upright members 208, 210 of the frame members 204, 206 are connected at their bottoms to reciprocal mating members 209, 211, which enable alignment of the sections 102-106 during retraction. As illustrated in FIGS. 2A and 2B, the frame member 204 includes mating members 211, 209, and the frame member 206 includes mating members 209, 211. In some embodiments, it is possible that frame member 204 includes mating members 211, 211, and frame member 206 includes mating members 209, 209. In other embodiments, it is similarly possible that frame member 204 includes mating members 209, 209, and the frame member 206 includes mating members 211, 211.

Figure 2C:
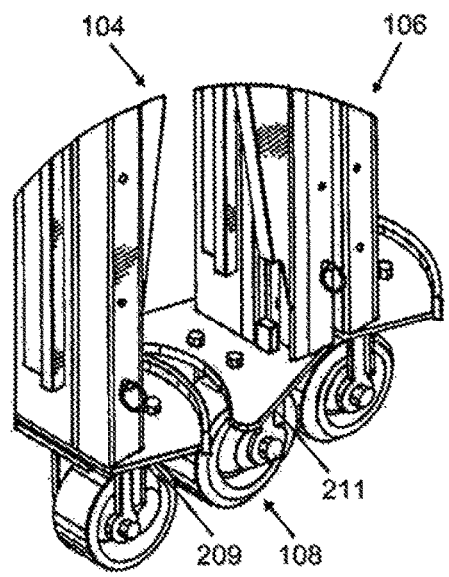
Figure 2D:
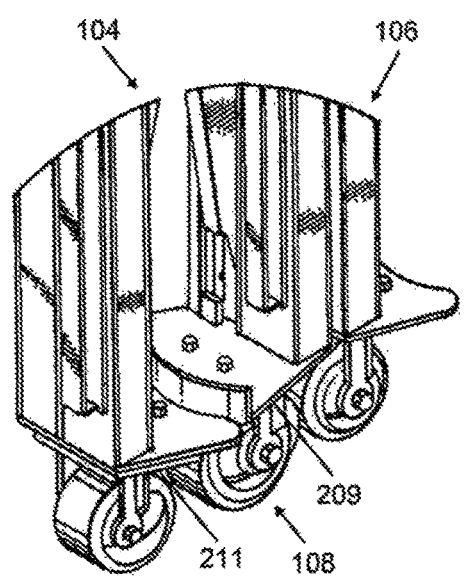
Figure 2E:
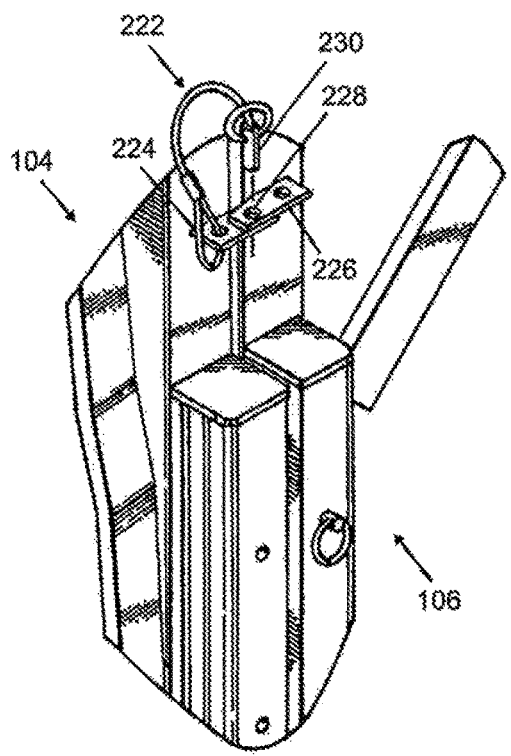

As illustrated in FIGS. 2C and 2D, the reciprocal mating members 209, 211 (FIG. 2C) and the reciprocal mating members 211, 209 (FIG. 2D) of example section 104 enable the alignment of section 104 during retraction of the passageway. The other sections of the passageway, such as sections 102, 106 can be similarly aligned during the retraction of the passageway.

Figure 2F:
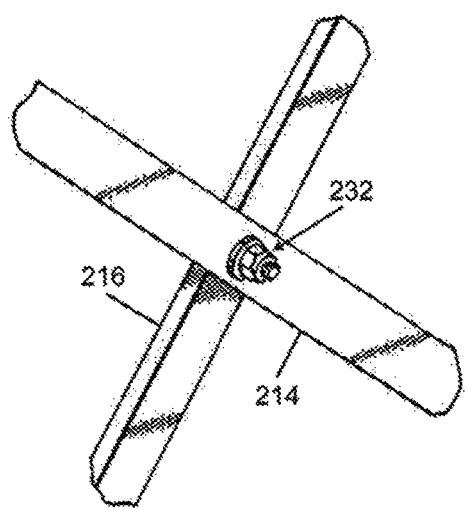
Figure 2G:
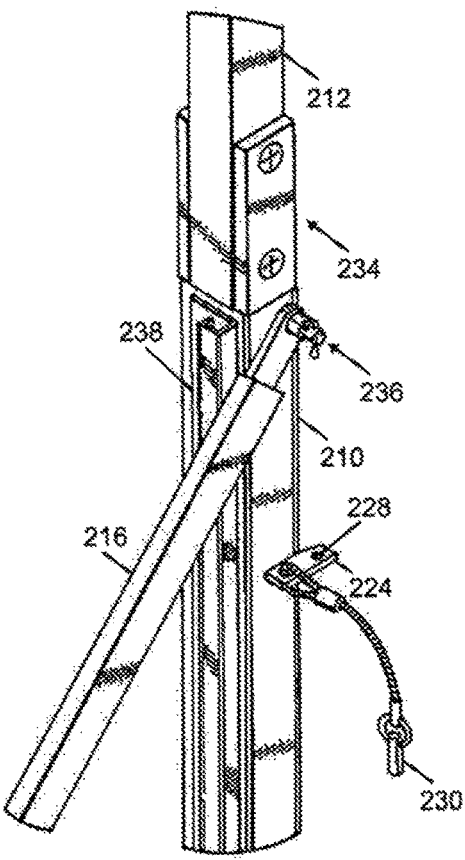

Two opposing scissor bar assemblies 114 connect the opposing frame members 204, 206 along sides of the upright members 208, 210 via connection devices 236 as illustrated in FIG. 2G. The connection device 236 and associated connections will be described in greater detail with reference to FIGS. 4A and 4B. Each of the scissor bar assemblies 114 includes scissor bars 214, 216 that are connected using a connection device 232 (e.g., nut/bolt), as illustrated in FIG. 2F.

As further illustrated in FIGS. 2A and 2B, the top ends of the scissor bars 214, 216 are rotatably and pivotably secured to a top section of the upright members 210, 210 of the respective frame members 204, 206. In addition, the bottom ends of the scissor bars 214, 216 are rotatably and slideably secured along a bottom section of the respective frame members 204, 206 to slide track assemblies 218, 220. It is noted that the same or similar construction and connection of the scissor bar assemblies 114 are used on both sides of the section 106, as well as on the other sections of the passageway, such as sections 102, 104, forming the extendable and retractable passageway as illustrated in FIG. 1. This passageway construction thus allows the scissor bars 214, 216 to articulate with respect to top and bottom sections of the upright members 208, 210 of the opposing frame members 204, 206, during extension of the passageway along various paths and retraction of the passageway for aligned stowing.

Moreover, the construction of the scissor bar assemblies 114 will be described in greater detail with reference to FIG. 6 and connection of the scissor bar assemblies 114 to the upright members 210, 210 (similarly to upright members 208, 208) will be described in greater detail with reference to FIGS. 4A and 4B. Moreover, the construction of the slide track assemblies 218, 220 and the connection of the scissor bar assemblies 114 to the slide track assemblies 218, 220 will be described in greater detail with reference to FIGS. 8 and 9.

Mating connector blocks 222 are provided at several locations (e.g., top and bottom) along the height of the upright members 208, 208 and upright members 210, 210 of respective sections to enable connection of these sections in order to form a continuous passageway that includes multiple sections, such as sections 102-106. This connectivity enables the addition of sections to, and the elimination of sections from, the passageway. For example, connector block 224 is provided along a first position of an upright member 210 of the section 104, while connector block 226 is provided along a second position of an upright member 210 of the section 106, as illustrated in FIGS. 2A, 2B, and 2E. The first and second positions enable the connector blocks 224, 226 to mate such that openings 228 overlap, which allows the pin 230 to extend through the openings 228, connecting the sections 104, 106 of the passageway. It is noted that the same or similar connector block construction and connection can be used on both sides of the sections 104, 106, along the heights of the upright members 208, 208 and upright members 210, 210, as well as on the other sections of the passageway. The construction of the mating connectors 222 will be described in greater detail hereinbelow with reference to FIG. 3.

It should also be noted that the connector blocks 224, 226 of adjacent sections of the passageway, such as sections 104 and 106, are disposed at slightly different heights in order to facilitate mating of the connector blocks 224, 226, such that the openings 228 overlap in order to receive the pin 230.

As illustrated in FIG. 2G, mirror-image brackets 238 are secured to the upright members 210, 210 of frame structure 202 in order to connect and support the extendable/retractable curtain assemblies 110, as will be described in greater detail hereinbelow with reference to FIG. 4A.

Figure 3:
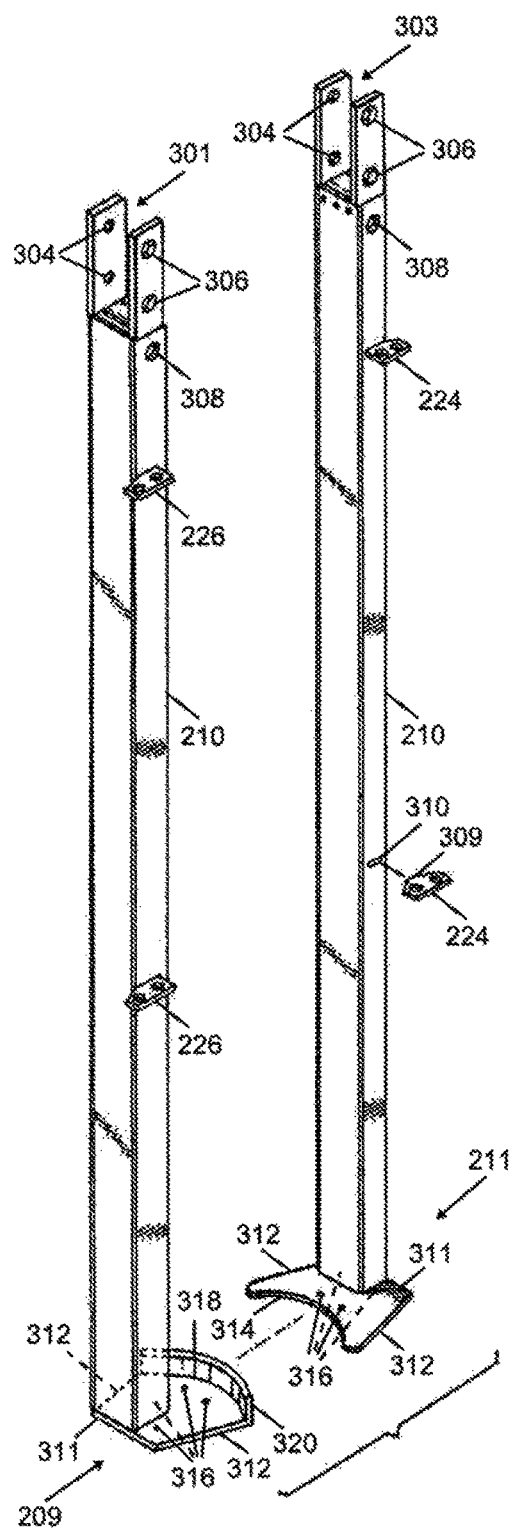
FIG. 3 illustrates example upright frame members of the frame structure as illustrated in FIGS. 2A and 2B.

FIG. 3 illustrates example upright members 210, 210 of the frame structure 202 as illustrated in FIGS. 2A and 2B. The upright members 210, 210 are of generally tubular construction (e.g., square cross-section). It should be noted that the cross-section of the upright members can vary.

Pairs of brackets 301, 303 are secured (e.g., welded) to the top of the upright members 210, 210, forming openings that receive the arch frame members 212. The pairs of brackets 301, 303 include apertures 304, 306, which receive bolts through the pairs of brackets 301, 303 in order to secure the arch frame members 212. The apertures 306 are countersunk on the exterior brackets of the pairs of brackets 301, 303, e.g., exterior side of the frame members 204, 206, allowing heads of the bolts to be disposed flush with the brackets, as illustrated in FIGS. 2G and 4A. Openings 308 are provided to receive bolts in order to secure the ends of the scissor bars 214, 216, as illustrated in FIGS. 2G-4B.

A pair of notches 310 is provided along the height of each of the upright members 210, 210 of respective frame members 204, 206 to receive projections 309 of the connector blocks 224, 226, such that precise positioning can be provided in order to secure (e.g., weld) the connector blocks 224, 226 with respect to the upright members 210, 210. The same or similar notches are provided along the height of the other upright members 208, 208 of the respective frame members 204, 206.

The mating members 209, 211 are secured (e.g., welded) to the bottom of the upright members 210, 210 of the respective frame members 204, 206. In particular, the mating member 211 of the frame member 206 is generally a planar plate that includes a straight back 311, flared sides 312, and an arcuate receiving front recess 314, extending between the flared sides 312. It is noted that this upright member 210 is secured toward one side of the flared sides 312, such that slide track assembly 220 can be secured (e.g., welded) to the mating member 211 and the upright member 210, as shown in FIGS. 2A and 2B. While the straight back 311 enables the different sections of the passageway to be secured to one another as closely as possible using connector blocks 224, 226 and pin 230, the front recess 314 of the mating member 211 provides a wide receiver in order to receive a vertical band 320 of the reciprocal mating member 209 of the frame member 204 during retraction, which provides for alignment of the passageway in the retracted configuration.

Moreover, the mating member 209 of the upright member 204 is generally a planar plate that includes a straight back 311, flared sides 312, an arcuate protrusion 318, extending between the flared sides 312, instead of the accurate recess 314. The arcuate protrusion 318 includes a vertical band 320 about the exterior of the arcuate protrusion 318. The band 320 prevents the mating members 209, 211 of the respective frame members 204, 206 from riding over one another, and the band 320 can further absorb force and allow sections to slide one with respect to another, as the sections collide during retraction of the passageway. The band 320 can be integrally formed with the mating member 209, or can be secured to the mating member 209. The band 320 can be made of a metal, plastic, rubber, Teflon, or combination of materials, which can absorb force and mitigate friction (allow sliding), as sections are retracted for stowing.

The upright members 208, 208 of the frame members 204, 206 are generally of the same or similar mirror-image construction to the upright members 210, 210 of the frame members 204, 206. Specifically, the apertures 304, 306 are reversed with respect to the brackets 301, 303, such that apertures 304 are on the interior of the brackets 301, 303, with countersunk apertures 306 being on the exterior of the exterior brackets 301, 303, e.g., the exterior side of the frame members 204, 206. Moreover, mirror-image notches 310 are provided on the exterior side of the upright members 208, 208.

Moreover, the mating members 211, 209 on one side are similar to the mating members 209, 211 on the other side of the frame structure 202, except that the upright members 208, 208 are secured toward the other side of the flared sides 312, such that slide track assemblies 218, 220 can be secured (e.g., welded) to the mating members 211, 209 and the upright member 208, 208, as shown in FIGS. 2A and 2B. Moreover, the mating members 209, 211 of upright members 210, 210 of the frame members 204, 206, as well as the mating members 211, 209 of upright members 208, 208 of the frame members 204, 206, include apertures 316 to secure the caster wheel assemblies 108 (e.g., using nuts/bolts), as illustrated in FIGS. 1-2D.

Figure 4B:
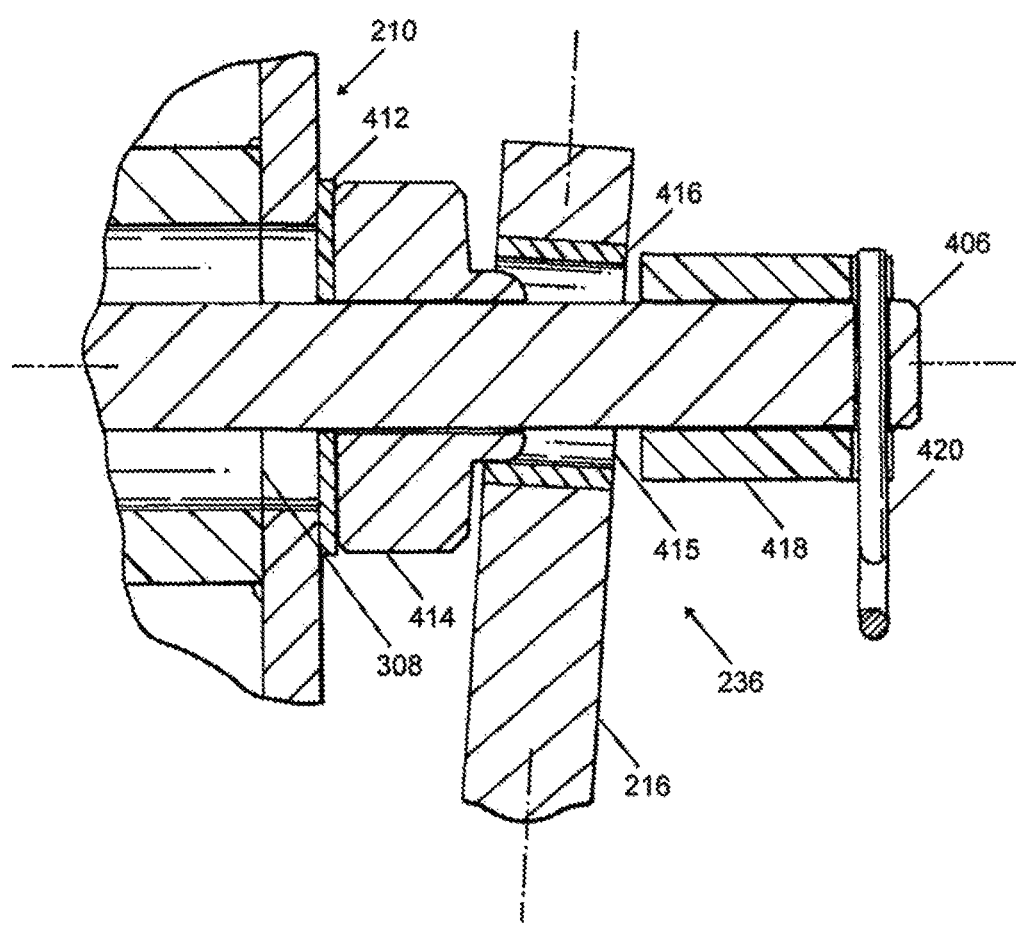

FIGS. 4A and 4B illustrate example construction of a top portion of the upright member 210 illustrated in FIG. 3 of the frame member 206 as illustrated in FIGS. 2A, 2B, and 2G. Moreover, FIG. 4A illustrates an exploded view of the components included in the construction illustrated in FIGS. 2A, 2B, and 2G, while FIG. 4B illustrates an example cross-section of the construction illustrated in FIG. 2B.

A bracket 238 is secured to the upright member 210 of the frame member 206 using bolts 404 secured through openings 403 along at least a portion of the height of upright member 210. A similar bracket (e.g., mirror image bracket) 238 is secured similarly to the upright member 210 of the frame member 204. The brackets 238 of the frame members 204, 206 support the extendable/retractable curtain assemblies 110. More specifically, the brackets 238 of the frame structures 204, 206 have extensions 402 (e.g., L-shaped extensions) configured to receive respectively a take-up roller 401 and a similar rod (not shown) to which the material 112 of the curtain assemblies 110 is secured, such that the curtain assemblies 110 extend and retract with the extension and the retraction of the sections 102-106. It is noted that both sides of the curtain assemblies 110 can be secured to take-up rollers, such as take-up roller 401.

The end of the scissor bar 216 is secured to the upright member 210 using the connection device 236. The connection device 236 can include a bolt 406, washer 408, locking tension washer 412, lock nut 414 (having a domed end), bushing 416, lock nut 418 (having ridges), and cotter pin 420. The bolt 406 is inserted through the washer 408 and an aperture (not shown) on a first side of upright member 210, exiting through the aperture 308 on the other side of the upright member 210. The locking tension washer 412 and nut 414 are secured onto the bolt 406, to hold the bolt in place with respect to the upright member 210.

The aperture 415 of the scissor bar 216 receives bushing 416, which fits over the domed end of the nut 414. The bushing 416 can be made of bronze, or another material. Thereafter, the lock nut 418 is secured onto the bolt 406 and the cotter pin 420 is inserted though opening 410 in the bolt 406 and between ridges of the lock nut 418. With this construction, the scissor bar 216 is provided with some play, such that the scissor bar 216 can rotate about the bolt 406 as well as pivot about the domed end of the lock nut 414, during curved extension of the passageway along various paths and also retraction of the passageway for aligned stowing.

The arch frame member 212 is secured to the upright member 210 using connection devices 234. A connection device 234 can include a pair of brackets 303, bolts 422, washer 424, locking tension washer 426, and lock nut 428. More specifically, the arch frame member 212 is disposed between the pair of brackets 303, and is secured using the bolts 422, washer 424, locking tension washer 426, and lock nut 428. The heads 423 of the bolts 422 are disposed in the countersunk apertures 306 and flush with the exterior bracket of the pair of brackets 303.

Figure 5A:
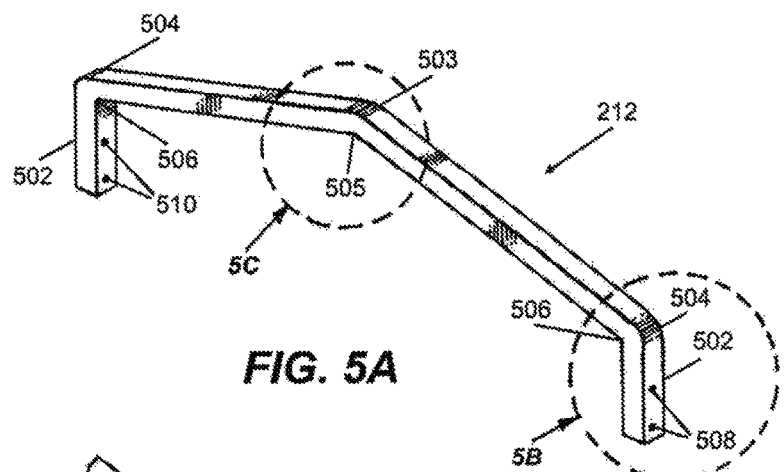
FIGS. 5A-5C illustrate an example arch frame member of the frame members as illustrated in FIGS. 2A and 2B.
Figure 5B:
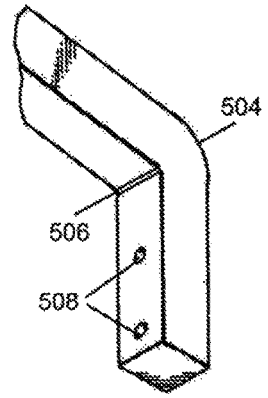
Figure 5C:
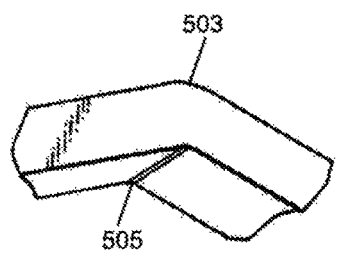

FIGS. 5A-5C illustrate an example arch frame member 212 of the frame members 204, 206 as illustrated in FIGS. 2A and 2B. As illustrated, the arch frame member 212 is fabricated by bending (curving) outer center section 503 and outer corner sections 504 along the top of the arch member 212, and by notching inner center section 505 and inner corner sections 506 along the bottom of the arch frame member 212, forming upright sections 502.

The notched sections 505, 506 are welded to provide stiffness to the arch frame member 212, resulting in stiffness of the frame members 204, 206 of the passageway section 106. This is important as it allows aligned extension and retraction of the passageway because this mitigates the splaying out of the upright members 208, 210 from each other during operation of the passageway.

As further illustrated, the upright sections 502 of the arch frame member 212 have openings 508, 510 that receive bolts 422 in order to secure the arch frame member 212 to the brackets 301, 303 of the upright members 208, 210.

Figure 6:
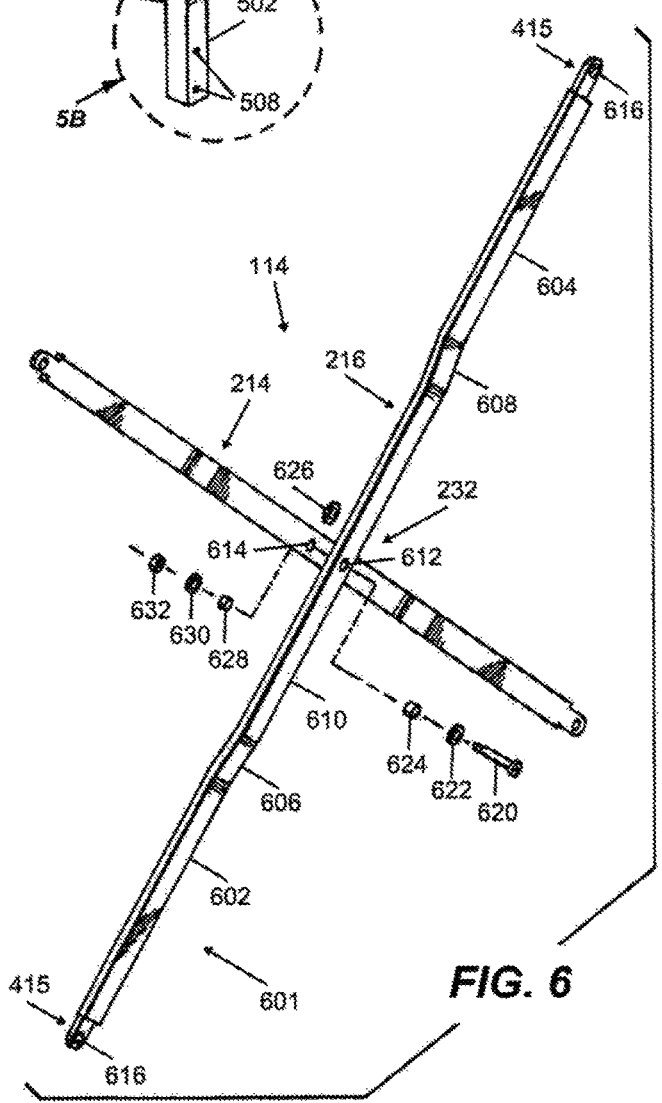
FIG. 6 illustrates an example scissor bar assembly as illustrated in FIGS. 1-2B.

FIG. 6 illustrates an example scissor bar assembly 114 illustrated in FIGS. 1-2B. The scissor bar assembly 114 includes scissor bars 214, 216. The scissor bars 214, 216 are of similar construction. Accordingly, only scissor bar 216 is described in detail.

The scissor bar 216 includes a body 601 and a pair of connectors 616. The body 601 includes flat sections 602, 604, 610, and angled sections 606, 608. The angled sections 606, 608 allow section 610 to be recessed in relation to the section 602, 604. The pair of connectors 616 extends from the sections 602, 604 and includes apertures 415.

The recessed section 610 of scissor bar 216 is mated with the reciprocal recessed section of the scissor bar 214, which is of similar construction. The scissor bars 214, 216 can be made of hot-rolled-pickled-oiled (HRPO) steel that is hot dipped and galvanized. Moreover, the scissor bars 214, 216 can be ¾" in height by 1½" wide. The foregoing construction and materials provide a resilient scissor bar assembly 114, which can flex and/or deflect during arcuate extension of the section and/or passageway, and which can further return to its original state with retraction of the section and/or passageway.

The scissor bars 214, 216 are secured using the connection device 232. The connection device 232 can include a bolt 620, washers 622, 630, bushings 624, 628, and lock nut 632. The bushings 622, 628 can be made of bronze, another material, or a combination of materials. A washer 626 (e.g., Teflon, another material, or combination of materials) is provided between the scissor bars 214, 216 in order to reduce friction among the scissor bars 214, 216. The washer 626 can be made of any other material or a combination of materials.

Figure 7:
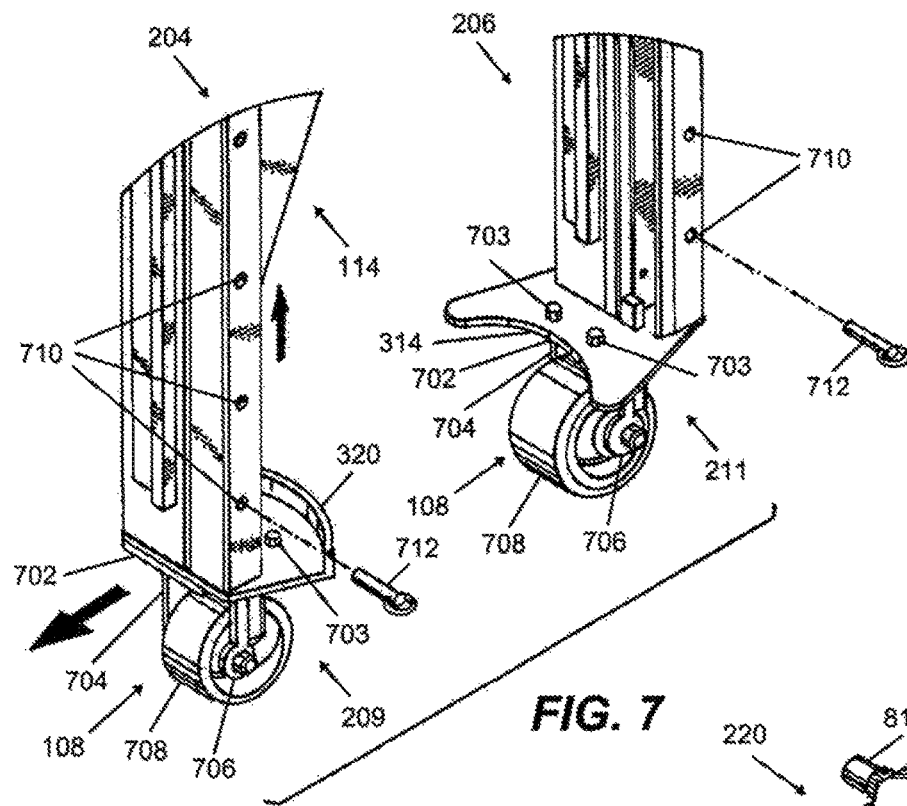
FIG. 7 illustrates example caster-wheel assemblies of the passageway illustrated in FIGS. 1-2B.

FIG. 7 illustrates example caster-wheel assemblies 108 of the passageway illustrated in FIGS. 1-2B. Each of the caster-wheel assemblies 108 includes a connector plate 702, wheel bracket 704, connector member 706, and wheel 708. The connector plate 702 secures the caster-wheel assemblies 108 using one or more connectors 703 (e.g., bolt/nut combinations) to the mating members 209, 211 of the frame members 204, 206. The wheel bracket 704 secures the wheel 708 of the caster-wheel assemblies 108 using the connector member 706 (e.g., bolt, pin, etc.).

The slide track assemblies 218, 220 include multiple openings 710 along their height to receive pins 712 in order to secure the scissor bar assembly 114 in a certain configuration, which can be the retracted configuration (as illustrated in FIGS. 2C and 2D), the extended configuration (as illustrated in FIGS. 2A and 2B), or an intermediate configuration between the retracted and extended configurations (not shown).

Figure 8:
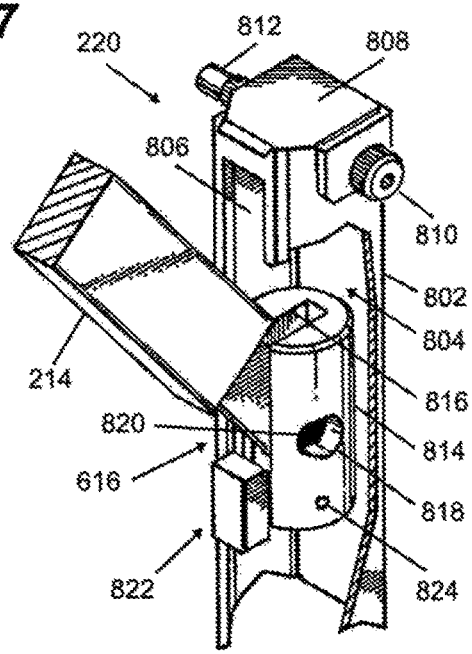
FIGS. 8 and 9 illustrate an example slide track assembly illustrated in FIGS. 1-2B.
Figure 9:
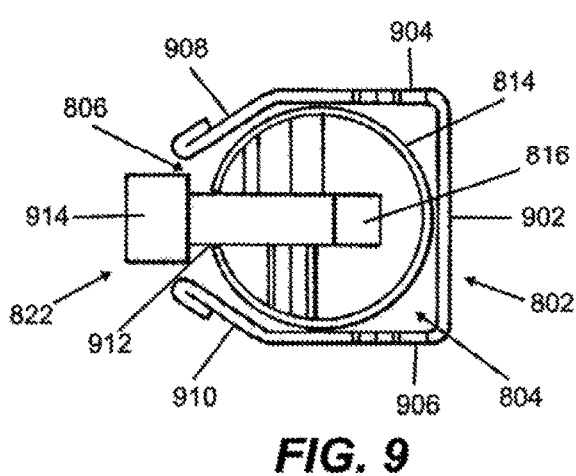

FIGS. 8 and 9 illustrate an example slide track assembly 220 illustrated in FIGS. 1-2B. The slide track assembly 220 includes a slide track 802, and a slide block 814. As illustrated in FIGS. 2A and 2B, the slide track assembly 220 is disposed atop the mating member 211, proximately to the upright member 210 of the frame member 206. Similarly, the slide track assembly 218 is disposed atop the mating member 209, proximately to the upright member of the frame member 204, as also illustrated in FIGS. 2A and 2B.

The slide track 802 includes a cavity 804, channel 806, and cover (or cap) 808. The slide track 802 can be made of stainless steel, another material, or a combination of materials.

The slide block 814 is generally of a round cross section. Moreover, the slide block 814 can slide (e.g., ascend and descend) within the cavity 804 and can also rotate within the cavity 804, while the connector 616 of the scissor bar 214 can extend through and slide (ascend and descend) in the channel 806. The slide block 814 can be made of Teflon to mitigate friction. Similarly with respect to the slide track assembly 218, a slide block (not shown) can slide within a slide track (not shown), while connector 616 of the scissor bar 216 can extend through and slide (ascend and descend) in a channel (not shown) of the slide track assembly 218. This allows the scissor bar assemblies 114 on both sides of the passageway sections 102-106 to extended and retract, which in turn allows the sections 102-106 to extend and retract.

The cover 808 is secured to the slide track 802 using a connector, such as bolt 810 and lock nut 812. The cover 808 limits the top extent of the slide block 814 within the cavity 804, while the mating member 211 limits the bottom extent of the slide block 814 within the cavity 804.

The slide block 814 includes a channel 816, aperture 818, shoulder bolt 820, alignment guide block 822, and aperture 824. The slide block 814 can be made of Teflon in order to reduce friction and provide sliding, or can be made of another material, or a combination of materials. The connector 616 of the scissor bar 214 is secured to the slide block 814 using the shoulder bolt 820 extended through the aperture 818. Moreover, the channel 816 allows the connector 616 of the scissor bar 216 to pivot within the channel 816 about an axis of the aperture 818, e.g., about the shoulder bolt 820 extended through the aperture 818.

The alignment guide block 822 is secured within the channel 816 of the slide block 814, and extends through the channel 806 of the slide track 802 to the outside of the slide track assembly 220. The alignment guide block 822 can be made of Teflon in order to reduce friction and provide sliding, or can be made of another material, or a combination of materials. The alignment guide block 822 limits the rotation (e.g., side-to-side) of the slide block 814 within the cavity 804, and prevents the scissor bar 214 from contacting edges of the channel 806, which mitigates jamming or binding of the scissor bar 214 with respect to the slide track 802.

The aperture 824 allows the receipt of the pin 712 through the aperture 824 and the opening 710 along the upright member 210 in order to fixate or secure the height of the slide block 814 within the slide track 802, as illustrated in FIG. 7.

As particularly illustrated in FIG. 9, the slide track 802 is defined by planar back 902 and perpendicular sidewalls 904, 906. Moreover, the channel 806 of the slide track 802 is defined by angled sidewalls 908, 910 extending from the sidewalls 904, 906. The alignment guide block 822 includes an arm 912 and a guide block 914. The arm 912 is secured within the channel 816 and extends toward the channel 806, while the guide block 914 extends through the channel 806 at least partially to the exterior of the slide track 802, such that rotational movement of the slide block 814 (left-to-right, or right-to-left) causes the guide block 914 to engage or contact the angled sidewalls 908, 910, respectively, thus limiting the rotational movement of the guide block 914 as well as slide block 814, and preventing the scissor bar 214 from engaging or contacting the angled sidewalls 908, 910.

FIGS. 10A and 10B illustrate an example passageway 1000 that is extended along several example paths 1001, 1003 in accordance with FIGS. 1-9. The passageway 1000 includes a gate section 1002, plurality of sections 1006, airplane section 1008, and canopy 1010.

The gate section 1002 is generally positioned proximately to the gate of the terminal, providing an entry 1004 to the passageway 1000. The gate section 1002 can abut, connect, or can otherwise be secured to the gate. The airplane section 1008 is generally positioned proximately the airplane stairway, providing an exit 1012 from the passageway 1000 to the airplane. The airplane section 1008 can be provided with the canopy 1010 that can extend from the airplane section 1008 and overhangs the stairway of the airplane in order to protect passengers from weather elements, e.g., sun, rain, snow, etcetera.

The sections 1006 are extendable and retractable, as described with reference to the sections 102-106 illustrated in FIGS. 1-9. Motorized ground equipment 1014 can be used to extend and retract the passageway 1000 having a certain number of sections 1006. As particularly illustrated in FIGS. 10A and 10B, the passageway 1000 is extended along arcuate paths 1001, 1003. Similarly, the passageway 1000 can be extended along a multiplicity of other arcuate paths as well as generally straight path, as may be necessary to mate with the arriving/departing airplanes parked at various locations in relation to the gate of the terminal. The passageway 1000 can be retracted for stowing, as described with reference to FIGS. 1-9.

Figure 11A:
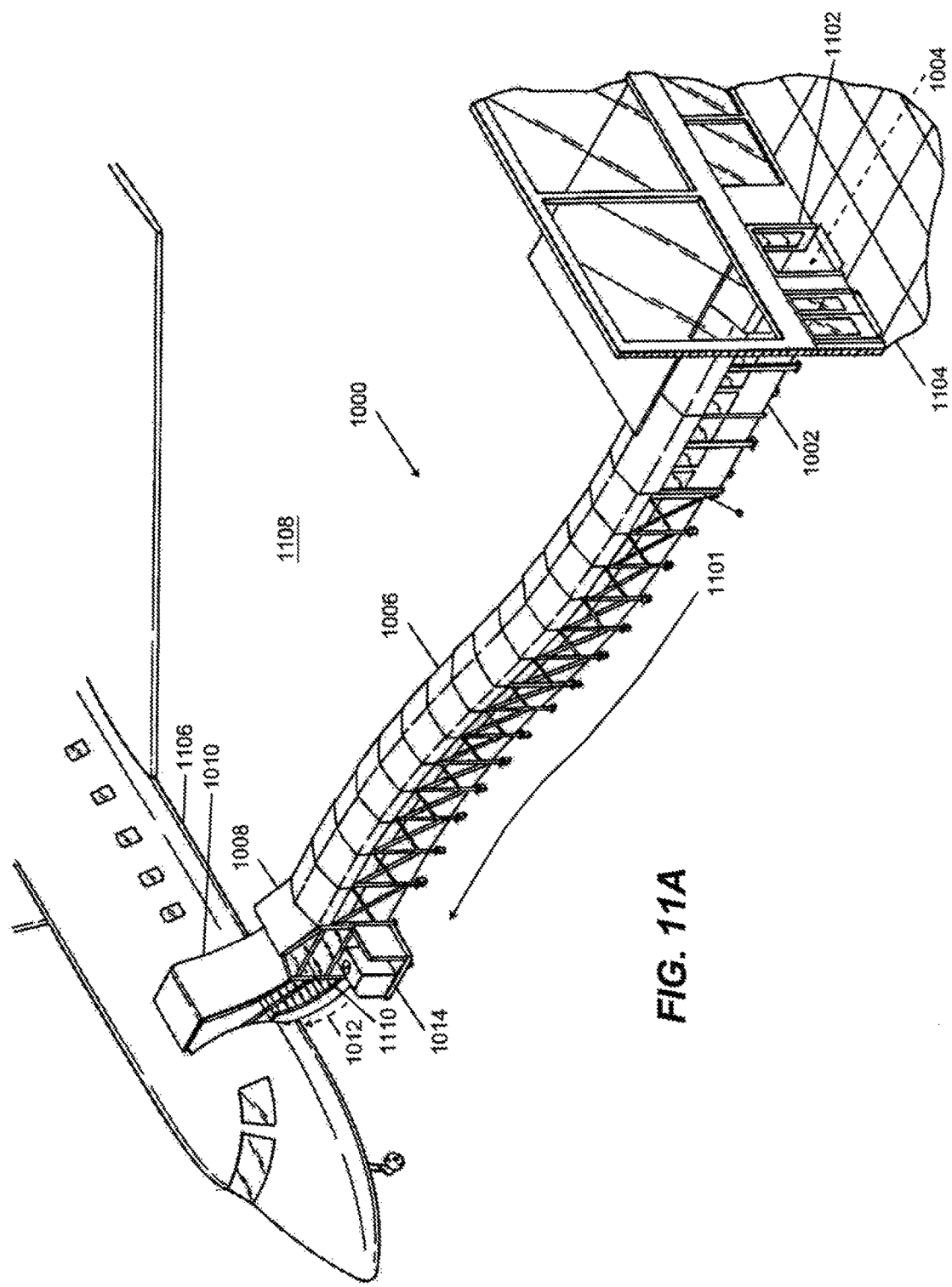
FIGS. 11A-11C illustrate an example passageway that is extended along several example paths for boarding/deplaning an airplane and/or a vessel, and further retracted to an example aligned path for stowing in accordance with FIGS. 1-10B.
Figure 11B:
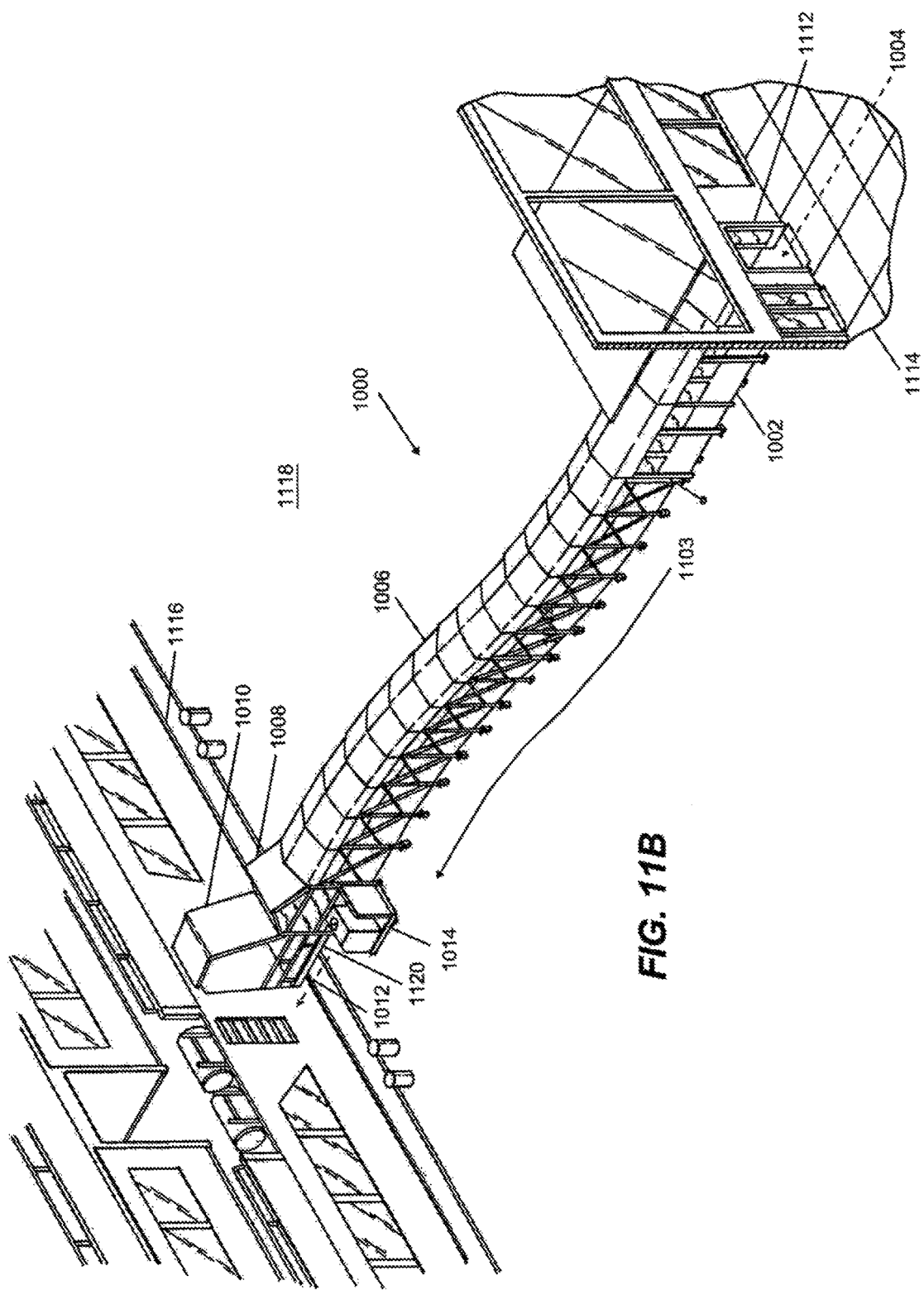
Figure 11C:
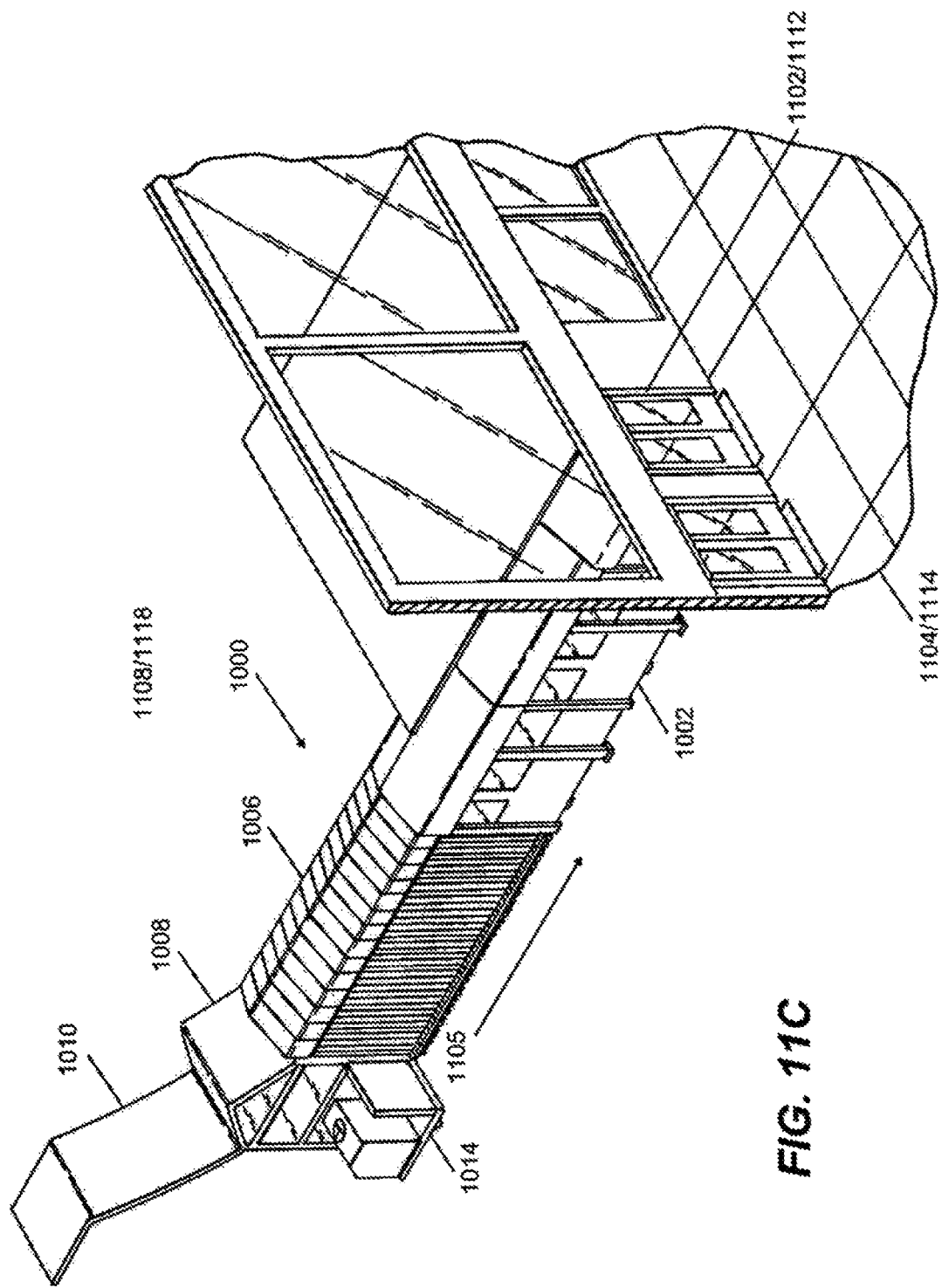
Figure 12A:
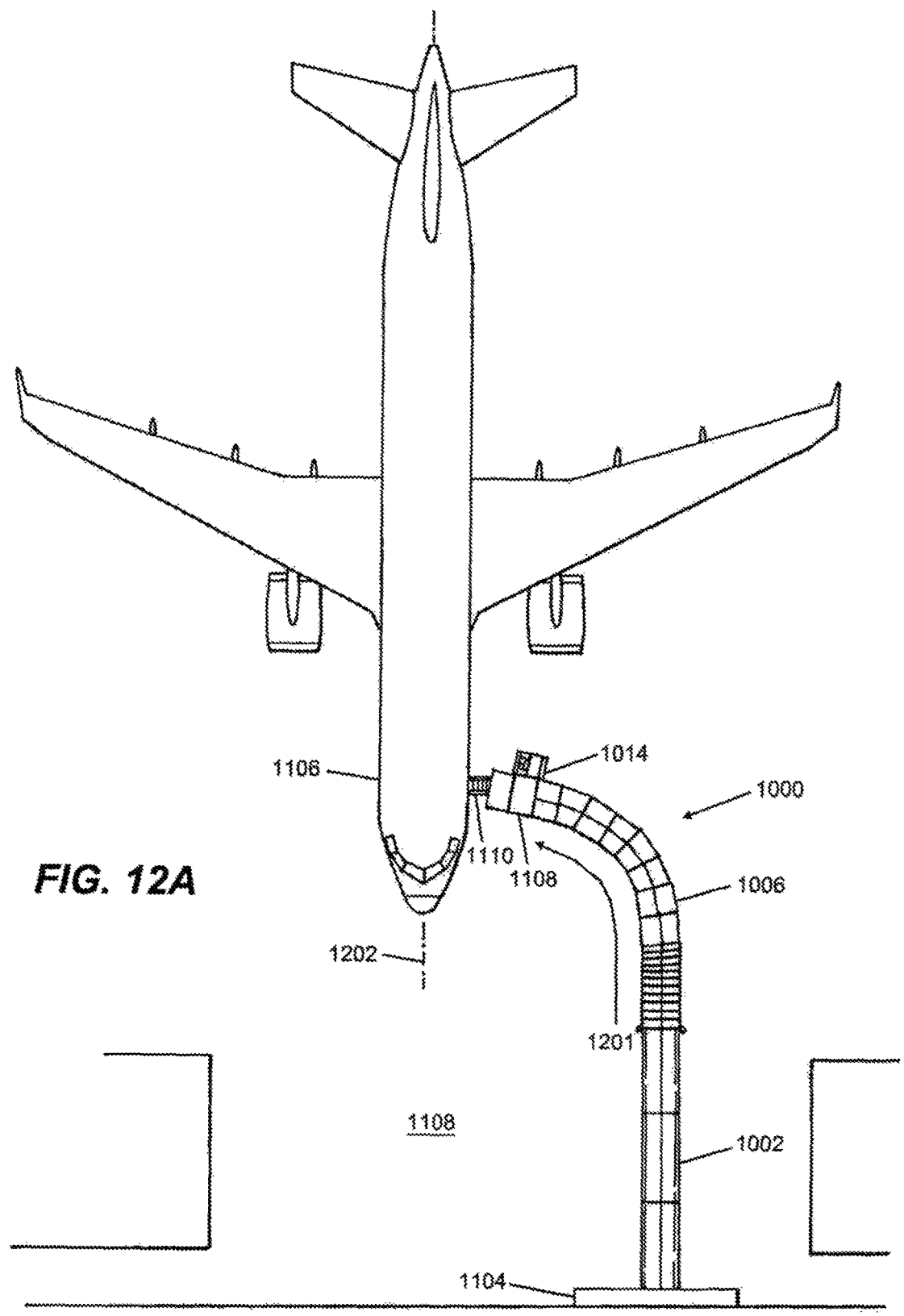
FIGS. 12A-12D illustrate example operation of the passageway extended along several example paths between an airport terminal and an airplane for boarding and deplaning according to FIGS. 1-11C.
Figure 12B:
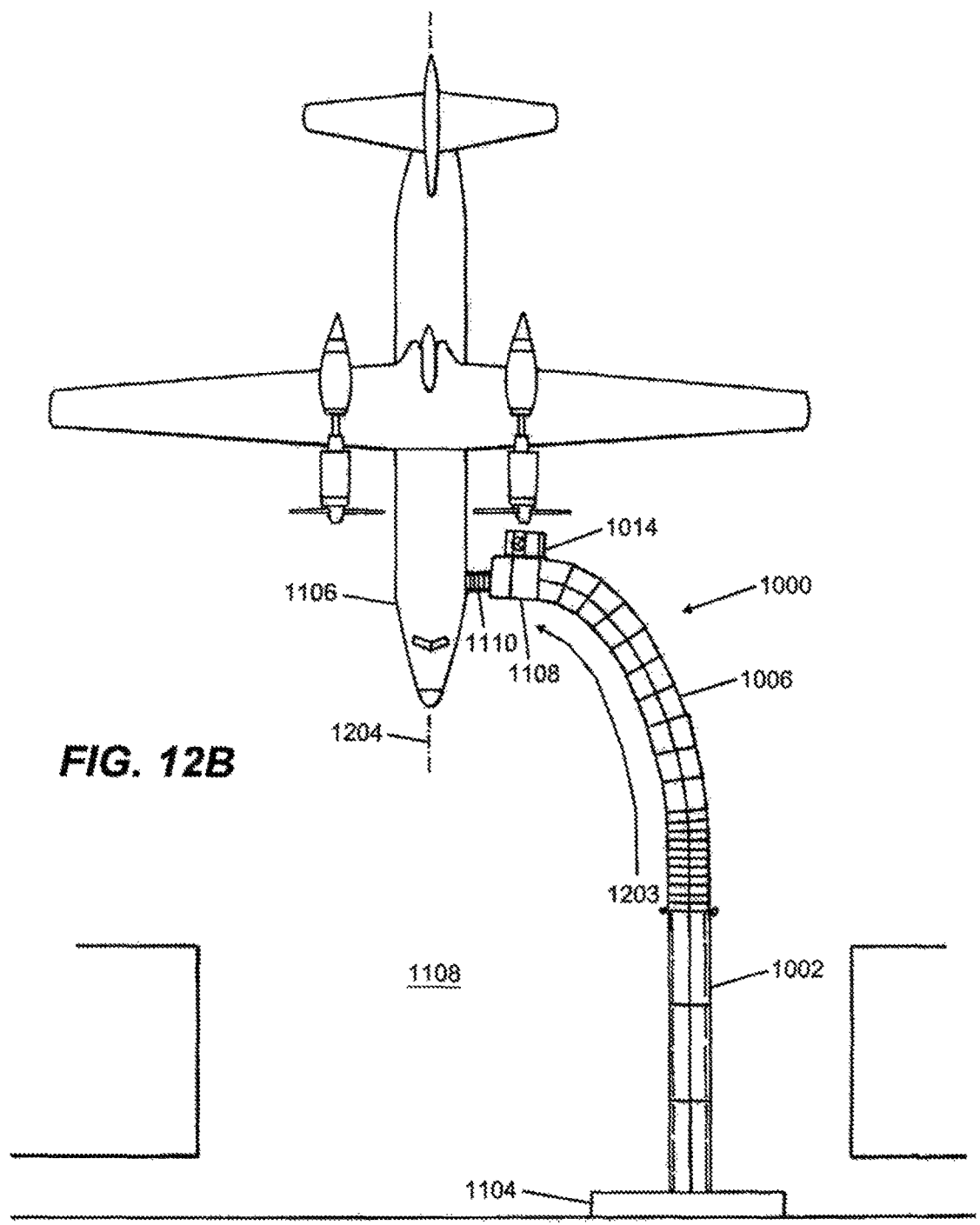
Figure 12C:
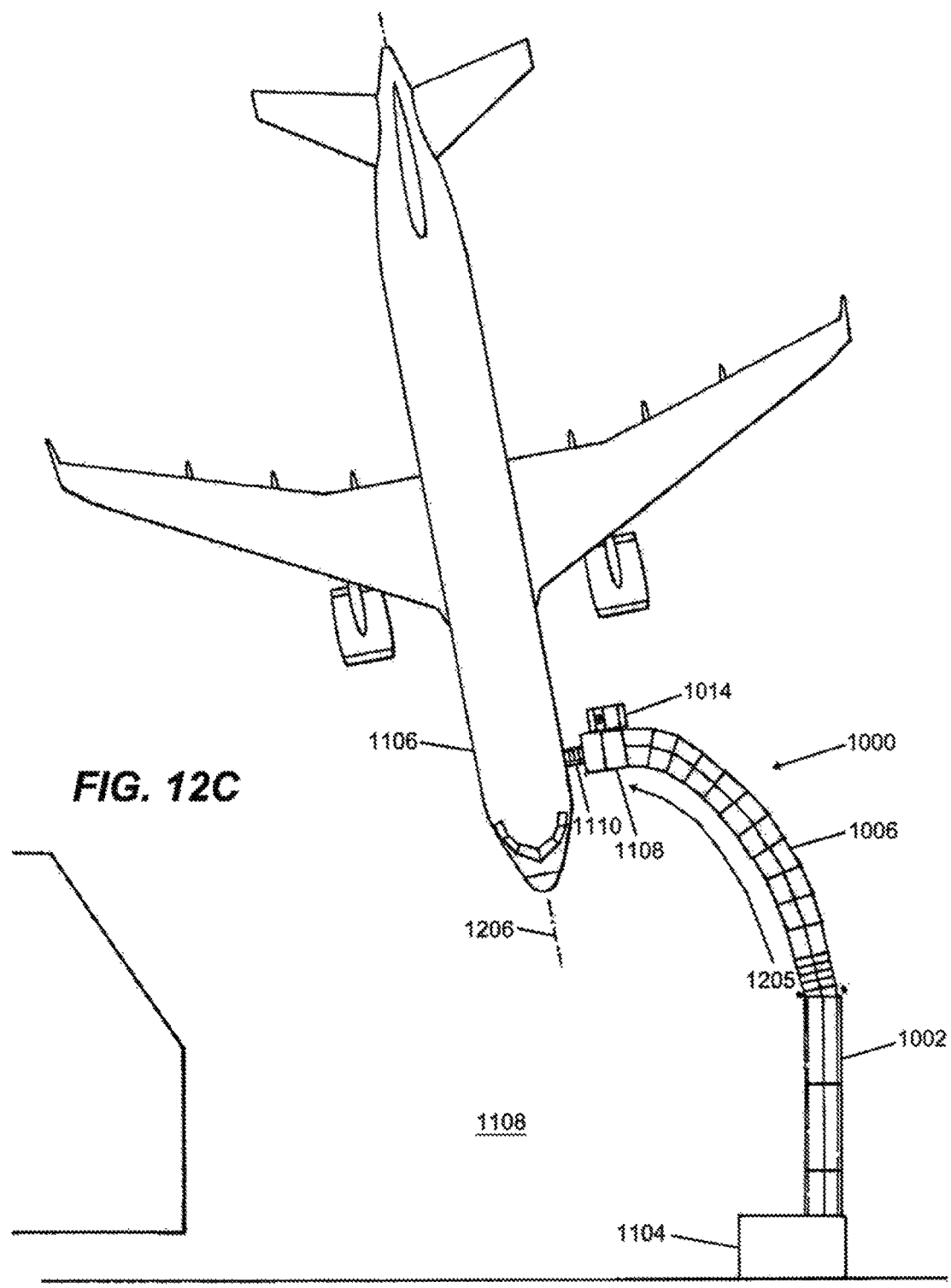
Figure 12D:
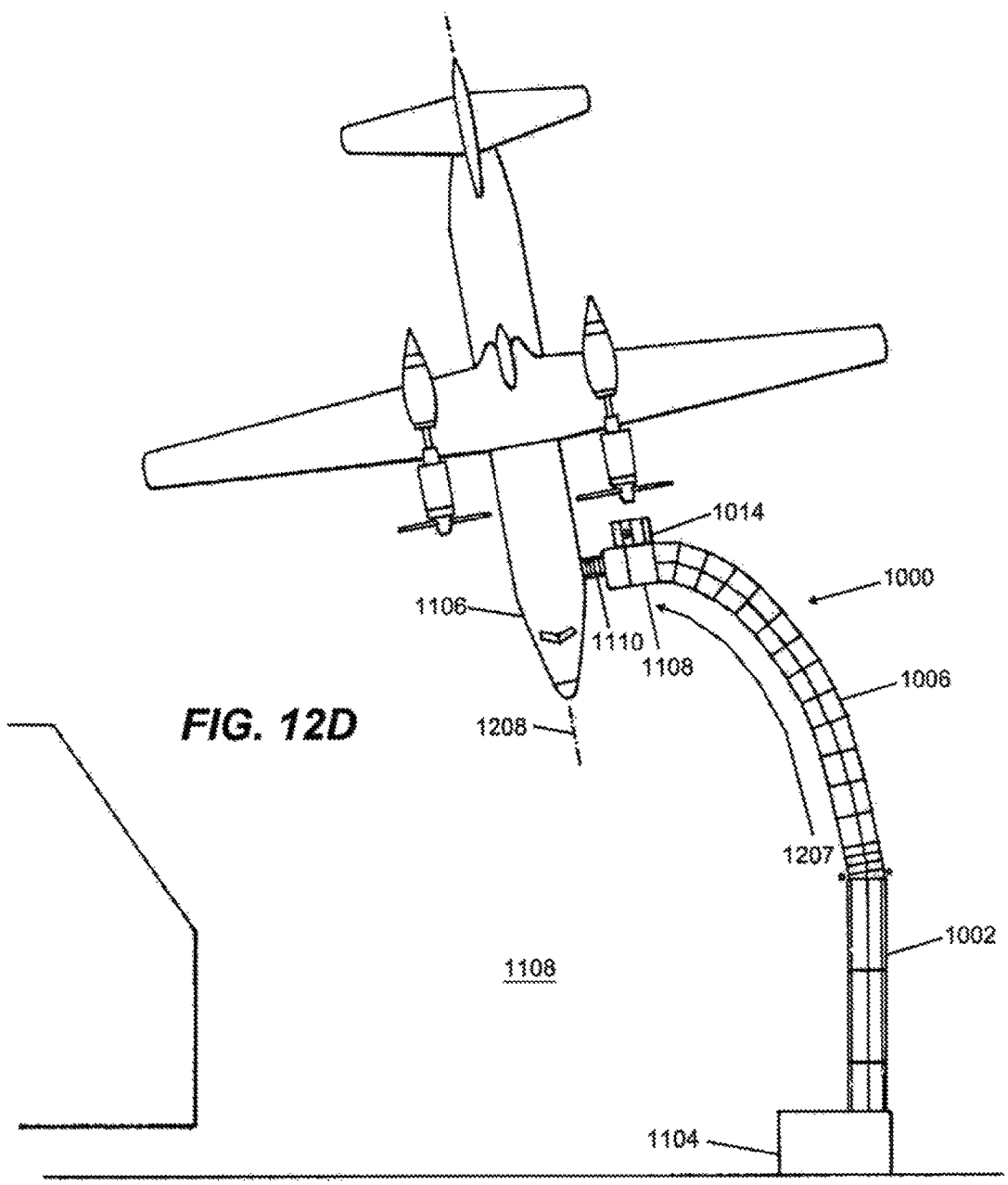

FIGS. 11A-11C illustrate an example passageway that is extended along several example paths 1101, 1103 for boarding/deplaning an airplane 1106 and/or vessel 1116, and further retracted to an example aligned path for stowing in accordance with FIGS. 1-10B.

The passageway 1000 includes a gate section 1002, plurality of sections 1006, airplane section 1008, and canopy 1010, as described hereinabove with reference to FIGS. 10A and 10B. For clarity and brevity of this description, the airplane section 1008 can also be referenced as a vessel section with reference to FIG. 11B.

As illustrated in FIG. 11A, the gate section 1002 is positioned proximately the entrance to the gate 1102 of the airport terminal 1104, providing the entry 1004 to the passageway 1000. The passageway 1000 is extended over an airport apron 1108 along an arcuate path 1101, such that the airplane section 1008 is positioned proximately an airplane stairway 1110, providing the exit 1012 from the passageway 1000 to the airplane 1106. The canopy 1010 extends from the airplane section 1008 and overhangs the stairway 1110 of the airplane 1106 in order to protect passengers from the weather elements.

As illustrated in FIG. 11B, the gate section 1002 is positioned proximately the entrance to the gate 1112 of the seaport terminal 1114, providing the entry 1004 to the passageway 1000. The passageway 1000 is extended over a pier surface 1118 along an arcuate path 1103, such that the vessel section 1008 is positioned proximately a vessel gangway 1120, providing the exit 1012 from the passageway 1000 to the vessel 1116. The canopy 1010 extends from the vessel section 1008 and overhangs the vessel gangway 1120 of the vessel 1116 in order to protect passengers from the weather elements.

As illustrated in FIGS. 11A-11C, the sections 1006 are extendable and retractable, as described with reference to the sections 102-106 illustrated in FIGS. 1-9. As particularly illustrated in FIG. 11C, the passageway 1000 is retracted over the airport apron 1108 or pier surface 1118 from the arcuate paths 1101, 1103 to an aligned path or configuration 1105 for stowing, as described with reference to FIGS. 1-9. As further illustrated in FIG. 11C, the entrance to the gate 1102, 1112 of the terminal 1104, 1114 can be closed when the passageway 1000 is stowed.

FIGS. 12A-12D illustrate example operation of the passageway extended along several example paths 1201, 1203, 1205, 1207 between an airport terminal 1104 and an airplane 1106 for boarding and deplaning according to FIGS. 1-11C.

As particularly illustrated in FIGS. 12A-12D, the passageway 1000 can permit safe and efficient boarding and deplaning at the ground-level (e.g., airport apron or tarmac 1108) to the airport terminal 1104. As illustrated, the airplane 1106 is parked at certain distances from the airport terminal 1104 and at various angles 1202, 1204, 1206, 1208 to the airport terminal 1104. Similarly, the airplane 1106 can be parked at a variety of locations and orientations with respect to the airport terminal 1104.

The passageway 1000 is extended from the entrance to the gate of the airport terminal 1104 along arcuate pathways 1201, 1203, 1205, 1207 to the stairway 1110 of the airplane 1106, allowing passengers to board and deplane the airplane using the passageway 1000 and the stairway 1110. The passengers can enter the airport terminal 1104 from the passageway 1000, and can exit the airport terminal 1104 to the passageway 1000, as illustrated in FIGS. 12A-12D. Accordingly, the passageway 1000 provides containment, safety, and security to passengers between the airplane 1106 and the airport terminal 1104, mitigating exposure to outside weather, while also complying with airport regulations concerning containment of passengers over the airport apron. Upon completion of the boarding and deplaning, the passageway 1000 can be retracted partially or fully, as illustrated in the example FIG. 11C.

It is noted that airplanes, such as airplane 1106, can be positioned on the apron or tarmac 1108 at different distances and orientations with respect to the entrance to the gate of the airport terminal, and the passageway 1000 is enabled via its component sections (e.g., sections 102-106) to extend to the various distances and along various arcs or paths in order to couple or interface with arriving and/or departing airplanes. After conclusion of boarding or deplaning, the component sections of the passageway 1000 can be retracted for stowing.

In operation of the passageway 1000, the scissor bar assemblies 114, slide track assemblies 218, 220, and mating members 209, 211 allow the passageway 1000 to extend and retract over a number of extensions-retraction cycles, mitigating alignment problems and thus the malfunction (jamming and binding) of the passageway 1000.

Moreover, the passageway 1000 improves customer service for ground boarding and deplaning of airline passengers, as well as ground embarking and disembarking of vessel passengers. The passageway 1000 can be manually deployable without a motorized ground equipment, or a motorized drive unit (e.g., FIGS. 10A-12D) can be provided and secured to the airplane/vessel section 1108 using one or more brackets (not shown) for a more automated extension and/or retraction. The passageway 1000 can be extended and/or retracted multiple times over straight or various arcuate paths to accommodate the different alignments of airplanes 1106 on the apron or tarmac 1108, as well as different alignments of vessels 1116 to the pier surface 1118.

The passageway 1000 offers protective outer covering made of one or a combination of materials (e.g., vinyl, nylon, other material, or combination of materials). The material(s) offer(s) considerable weather protection. In some implementations, the passageway 1000 can also be equipped with aluminum roof panels and clear sides, which can be installed over the frames structures 204, 206 of one or more sections of the passageway, once the passageway 1000 is installed. This can help to provide additional protection in severe weather conditions. The passageway can be fabricated from aluminum or other material (e.g., stainless steel) to meet certain rules and/or regulations for ground equipment.

In the foregoing, there has been described a passageway that mitigates alignment problems over multiplicity of extensions-retraction cycles, permitting extension along various paths to interface with arriving/departing airplanes and/or vessels, as well as permitting retraction for stowing. Although specific example embodiments have been described, it will be evident that various modifications and changes may be made to these embodiments without departing from the broader scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 37 C.F.R. § 1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate example embodiment.

The invention claimed is:

1. A passageway comprising a plurality of sections, the sections comprising at least one section that is extendable and retractable, the at least one section comprising:
   a frame structure comprising a pair of upright members on a first side of the frame structure;
   a pair of slide track assemblies disposed proximately to the respective pair of the upright members on the first side of the frame structure, each of the slide track assemblies comprising a slide track and a slide block, the slide track having a cavity and a channel, the slide block configured to ascend, descend, and rotate within the cavity, the slide block including a guide block that extends from the slide block at least partially through the channel; and
   a scissor bar assembly secured rotatably and pivotably to the pair of upright members and secured pivotably to slide blocks of the pair of slide track assemblies such that the pair of upright members is enabled to extend and retract with respect to each other along at least one arcuate path of the passageway, wherein the guide block limits rotation of the slide block within the slide track to rotation of the guide block within the channel.

2. The passageway of claim 1, wherein the slide track is defined by a back wall, perpendicular sidewalls, and angled sidewalls that extend toward each other from the perpendicular sidewalls, wherein the angled sidewalls define the channel.

3. The passageway of claim 1, wherein the slide block has a generally round cross-section.

4. The passageway of claim 1, wherein the slide block comprises an alignment guide block, the alignment guide block comprising an arm and the guide block that is secured to the arm, the arm being secured within the channel of the slide block.

5. The passageway of claim 1, wherein the scissor bar assembly comprises at least one scissor bar, the at least one scissor bar comprising a first connector and a second connector.

6. The passageway of claim 5, wherein the first connector is secured pivotably within a channel of the slide block.

7. The passageway of claim 5, wherein the at least one section comprises a connection device, the connection device configured to secure the second connector rotatably and pivotably to an upright member.

8. The passageway of claim 7, wherein the connection device comprises a lock nut having a domed end about which the second connector rotates and pivots in relation to the upright member.

9. The passageway of claim 1, wherein the pair of upright members comprises a respective pair of reciprocal mating members.

10. The passageway of claim 9, wherein the reciprocal mating members comprise:
   a first mating member that comprises a back, flared sides, and an arcuate receiving recess; and
   a second mating member that comprises a back, flared sides, and an arcuate protrusion, wherein the arcuate protrusion is enabled to align with the arcuate receiving recess.

11. The passageway of claim 10, wherein the second mating member comprises a band that extends at least partially along the arcuate protrusion, the band configured to interface with the arcuate receiving recess of the first mating member.

12. The passageway of claim 9, wherein at least one section comprises a pair of wheel assemblies secured to the respective pair of reciprocal mating members.

13. The passageway of claim 1, wherein the frame structure further comprises:
   a second pair of upright members on a second side of the frame structure; and
   an arch member secured to an upright member of the pair and an upright member of the second pair, the arch member comprising a plurality of curved sections and a plurality of corresponding notched sections, the curved sections extending along a top portion of the arch member and the notched sections extending along a bottom portion of the arch member, wherein the notched sections are welded to provide stiffness to the arch member and mitigate splay of the upright member of the first pair with respect to the upright member of the second pair.

14. The passageway of claim 1, wherein the slide track includes an opening along a height of the slide track, the slide block includes an aperture, and a pin is configured to be received through the opening and the aperture in order to secure the scissor bar assembly in a configuration along the height of the slide track.

15. The passageway of claim 1, wherein the scissor bar assembly comprises a first scissor bar and a second scissor bar, the first scissor bar having a first recessed section and the second bar having a reciprocal second recessed section, the first recessed section secured to the second recessed section to provide flexure and deflection to the scissor bar assembly.

16. The passageway of claim 1, wherein the at least one section comprises a canopy.

17. The passageway of claim 16, wherein material of the canopy is translucent or opaque.

18. The passageway of claim 16, wherein the canopy comprises one or more sections.

19. The passageway of claim 18, wherein material of at least one of the sections of the canopy is translucent or opaque.

20. The passageway of claim 1, wherein the at least one section of the passageway comprises a curtain assembly secured to the pair of upright members, the curtain assembly extendable and retractable with extension and retraction of the pair of upright members.

* * * * *